(12) United States Patent
Sathyamurthy et al.

(10) Patent No.: US 12,538,450 B2
(45) Date of Patent: Jan. 27, 2026

(54) MEMS-BASED FLOW SYSTEMS IN WATERPROOF DEVICES

(71) Applicant: Frore Systems Inc., San Jose, CA (US)

(72) Inventors: Prabhu Sathyamurthy, San Jose, CA (US); Suryaprakash Ganti, Los Altos, CA (US); Seshagiri Rao Madhavapeddy, La Jolla, CA (US); Nilesh Sudhir Hasabnis, Santa Clara, CA (US); Shekhar Halakatti, Campbell, CA (US)

(73) Assignee: Frore Systems Inc., San Jose, CA (US)

( * ) Notice: Subject to any disclaimer, the term of this patent is extended or adjusted under 35 U.S.C. 154(b) by 304 days.

(21) Appl. No.: 18/213,222

(22) Filed: Jun. 22, 2023

(65) Prior Publication Data

US 2023/0422433 A1 Dec. 28, 2023

Related U.S. Application Data

(60) Provisional application No. 63/355,493, filed on Jun. 24, 2022.

(51) Int. Cl.
| | |
|---|---|
| *H05K 7/20* | (2006.01) |
| *G06F 1/20* | (2006.01) |
| *H04M 1/02* | (2006.01) |
| *H05K 5/02* | (2006.01) |

(52) U.S. Cl.
CPC ......... *H05K 7/20218* (2013.01); *G06F 1/203* (2013.01); *H04M 1/026* (2013.01); *H05K 5/0215* (2022.08)

(58) Field of Classification Search
CPC ............... G06F 1/203; G06F 2200/201; G06F 1/1658; G06F 1/20; G06F 1/206; H05K 7/20172; H05K 7/20154; H05K 7/20145; H05K 5/0213; H05K 7/20209; H05K 5/03; H05K 7/2039; H05K 7/20; H05K 7/20281; H05K 7/20409; H05K 7/20436; H05K 7/20509; H05K 7/20572; F04B 43/046; F04B 17/003; F04B 43/095; F04B 45/045; F04B 53/10; F04B 53/1077; B81B 2203/0118; H04R 1/02; B06B 1/06; F16K 2099/0094; H10N 30/2047; H10N 30/308; H10N 30/88; H10N 35/80; H10N 30/20
See application file for complete search history.

(56) References Cited

U.S. PATENT DOCUMENTS

| | | | |
|---|---|---|---|
| 7,282,837 B2 | 10/2007 | Scher | |
| 11,532,536 B2 * | 12/2022 | Ganti | ...................... F04B 39/06 |
| 2005/0089415 A1 | 4/2005 | Cho | |

(Continued)

FOREIGN PATENT DOCUMENTS

WO 2016180927 11/2016

*Primary Examiner* — Michael A Matey
(74) *Attorney, Agent, or Firm* — Van Pelt, Yi & James LLP

(57) ABSTRACT

A computing device includes a housing having a plurality of apertures therein, an active cooling system, and at least one of a plurality of membranes or a plurality of valves. The membranes and/or valves are coupled with the apertures. Each of the membranes is watertight and gas breathable. The valves are configured to prevent entry of water through the apertures. The active cooling system is in the housing. When activated, the active cooling system drives a gas through a membrane but does not drive water through the membrane.

18 Claims, 12 Drawing Sheets

(56) References Cited

U.S. PATENT DOCUMENTS

| | | |
|---|---|---|
| 2005/0225213 A1 | 10/2005 | Richards |
| 2008/0041574 A1 | 2/2008 | Arik |
| 2008/0304979 A1 | 12/2008 | Lucas |
| 2011/0063800 A1 | 3/2011 | Park |
| 2011/0159795 A1* | 6/2011 | Sprague ............. H05K 7/20145 236/49.3 |
| 2011/0188247 A1* | 8/2011 | Huang ................... B01D 69/02 362/249.02 |
| 2012/0162903 A1* | 6/2012 | MacDonald ....... H05K 7/20136 361/679.46 |
| 2015/0114090 A1 | 4/2015 | Fukuda |
| 2016/0358841 A1* | 12/2016 | Eid ........................ H05K 1/181 |
| 2017/0235348 A1* | 8/2017 | Wolf ....................... G06F 1/203 361/679.46 |
| 2018/0146574 A1* | 5/2018 | Chen ................... H05K 7/20409 |
| 2019/0101938 A1* | 4/2019 | Mou ..................... F04B 43/046 |
| 2020/0080908 A1* | 3/2020 | Nyland ............... G01L 19/0672 |
| 2022/0150335 A1 | 5/2022 | Sathyamurthy |

* cited by examiner

MEMS-BASED FLOW SYSTEMS IN WATERPROOF DEVICES

CROSS REFERENCE TO OTHER APPLICATIONS

This application claims priority to U.S. Provisional Patent Application No. 63/355,493 entitled MEMS-BASED FLOW SYSTEM USABLE IN WATERTIGHT DEVICES filed Jun. 24, 2022 which is incorporated herein by reference for all purposes.

BACKGROUND OF THE INVENTION

As computing devices grow in speed and computing power, the heat generated by the computing devices also increases. Various mechanisms have been proposed to address the generation of heat. Active devices, such as fans, may be used to drive air through large computing devices, such as laptop computers or desktop computers. Passive cooling devices, such as heat spreaders, may be used in smaller, mobile computing devices, such as smartphones, virtual reality devices and tablet computers. However, such active and passive devices may be unable to adequately cool both mobile devices such as smartphones and larger devices such as laptops and desktop computers. Moreover, incorporating cooling solutions into computing devices may be challenging. Consequently, additional cooling solutions for computing devices are desired.

BRIEF DESCRIPTION OF THE DRAWINGS

Various embodiments of the invention are disclosed in the following detailed description and the accompanying drawings.

DETAILED DESCRIPTION

Figure 1A:
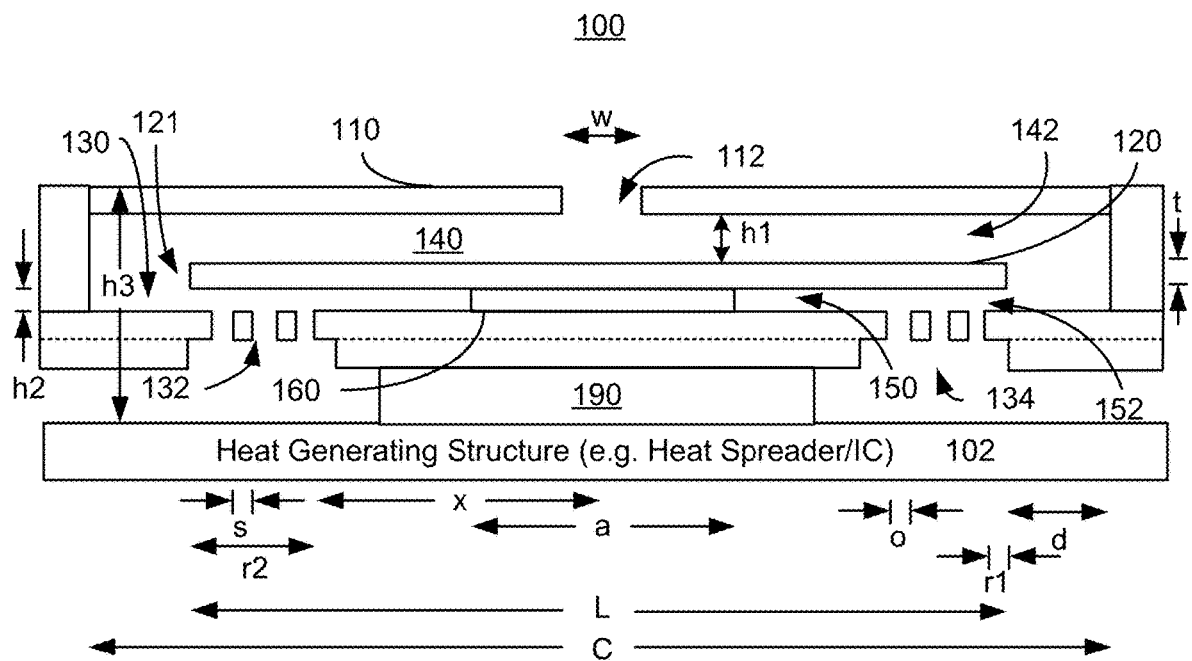
FIGS. 1A-1G depict an embodiment of an active MEMS cooling system including a centrally anchored cooling element.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As semiconductor devices become increasingly powerful, the heat generated during operations also grows. For example, processors for mobile devices such as smartphones, tablet computers, notebook computers, and virtual reality devices as well as for other computing devices such as servers, can operate at high clock speeds, but produce a significant amount of heat. Because of the quantity of heat produced, processors may run at full speed only for a relatively short period of time. After this time expires, throttling (e.g. slowing of the processor's clock speed) occurs. Although throttling can reduce heat generation, it also adversely affects processor speed and, therefore, the performance of devices using the processors. As technology moves to 5G and beyond, this issue is expected to be exacerbated. Further, other components in a computing device may generate heat. Thus, thermal management is increasingly an issue for computing devices.

Larger computing devices, such as laptop computers, desktop computers, or servers, include active cooling systems. Active cooling systems are those in which an electrical signal is used to drive cooling. An electric fan that has rotating blades is an example of an active cooling system, while a heat sink is an example of a passive cooling system. When energized, the fan's rotating blades drive air through the larger devices to cool internal components. However, space and other limitations in computing devices limit the use of active cooling systems. Fans are typically too large for mobile and/or thinner devices such as smartphones and tablet or notebook computers. Fans also may have limited efficacy because of the boundary layer of air existing at the surface of the components because they provide a limited airspeed for air flow across the hot surface desired to be cooled, and because they may generate an excessive amount of noise. Fans also have a limited backpressure. Space and power limitations may further restrict the ability to provide electrical connection to active cooling systems. For example, if multiple active cooling systems are used, the connections to the active cooling systems may be required to fit within a small area. In addition, the power consumed by such a cooling system may be desired to be small, particularly for mobile devices. Moreover, space limitations may adversely affect the ability to provide a sufficient flow for cooling computing devices. Mobile devices such as smartphones are increasingly desired to be waterproof. Active cooling devices may be particularly difficult to incorporate in a watertight package without significantly reducing the cooling effects of the active cooling system. Consequently, active cooling systems face particular challenges when used in computing devices such as active computing devices. Passive cooling solutions may include components such as a heat spreader and a heat pipe or vapor chamber to transfer heat to a heat exchanger. However, passive cooling solutions may be unable to provide a sufficient amount of heat transfer to remove excessive heat generated. Thus, additional cooling solutions are desired.

A computing device includes a housing having apertures therein, an active cooling system, and at least one of membranes or valves coupled with the apertures. Each of the membranes is watertight and gas breathable. The valves are configured to prevent entry of water through the apertures. The active cooling system is in the housing. When activated, the active cooling system drives a gas through a membrane but does not drive the water through the membrane. In some embodiments, the computing device is a smart phone.

The computing device may include a water immersion sensor that determines whether the computing device is immersed in water. The active cooling system is deactivated in response to a determination that the computing device is immersed in water. In some such embodiments, the vents close in response to the determination that the computing device is immersed in water. The computing may also include splash guards for the plurality of apertures.

In some embodiments, the computing device includes the membranes. In such embodiments, the active cooling system, when activated, draws the gas into the housing through an additional membrane of the plurality of membranes but does not draw water through the additional membrane and drives the gas out of the housing through the membrane. The housing may have a first side and a second side opposite to the first side. The membrane is coupled with a first aperture on the first side, while the additional membrane is coupled with a second aperture on the second side. The active cooling system includes an egress that may adjoin the membrane. In some embodiments, the active cooling system includes a spout having the egress. The spout is coupled with the housing and terminates at or near (i.e. proximate to) the membrane. In some embodiments, the active cooling system includes cooling element(s) undergoing vibrational motion when the active cooling system is activated. The vibrational motion drives the gas. Further, the active cooling system is thermally coupled to a heat-generating structure of the computing device by thermal conduction.

A method is described. The method is used to operate an active cooling system in a computing device such as a smart phone. The computing device includes the active cooling system, a housing having apertures therein, and at least one of a plurality of membranes or a plurality of valves coupled with the plurality of apertures. Each of the membranes is watertight and gas breathable. The valves are configured to prevent entry of water through the apertures. The method includes driving at least one cooling element of an active cooling system to undergo vibrational motion. When activated, the vibrational motion of the cooling element(s) drives a gas through a membrane of the plurality of membranes but does not drive water through the membrane.

Figure 1B:
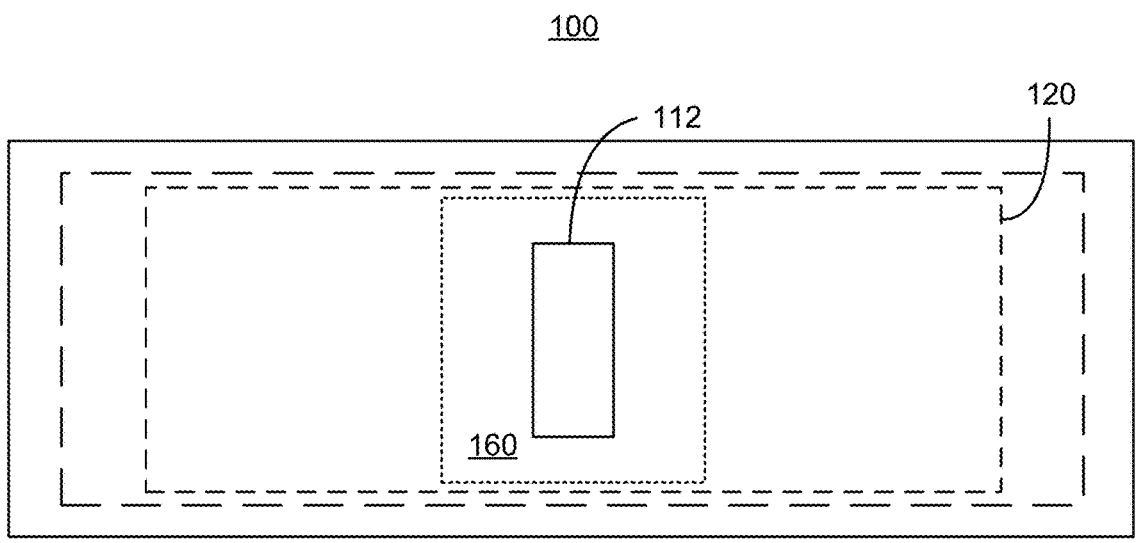
Figure 1C:
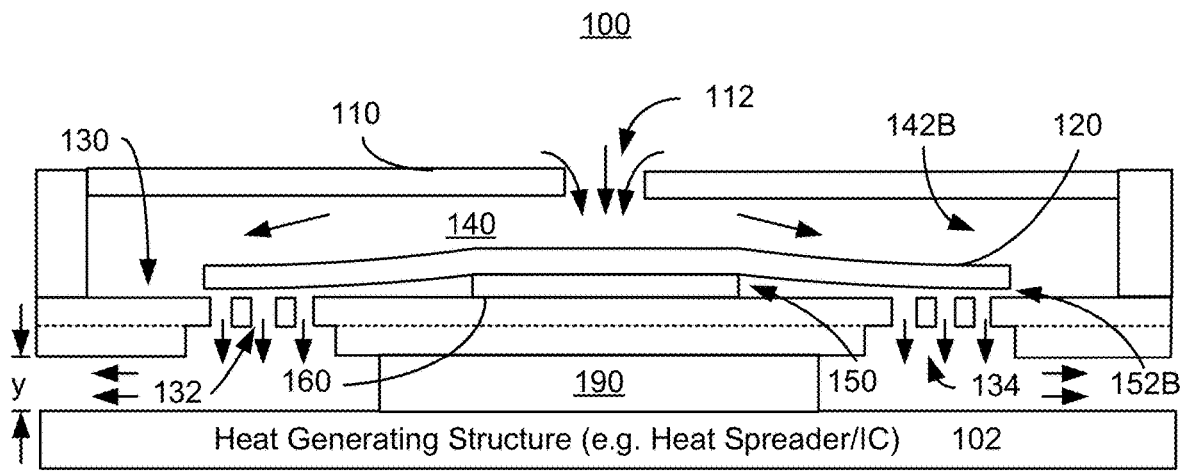
Figure 1D:
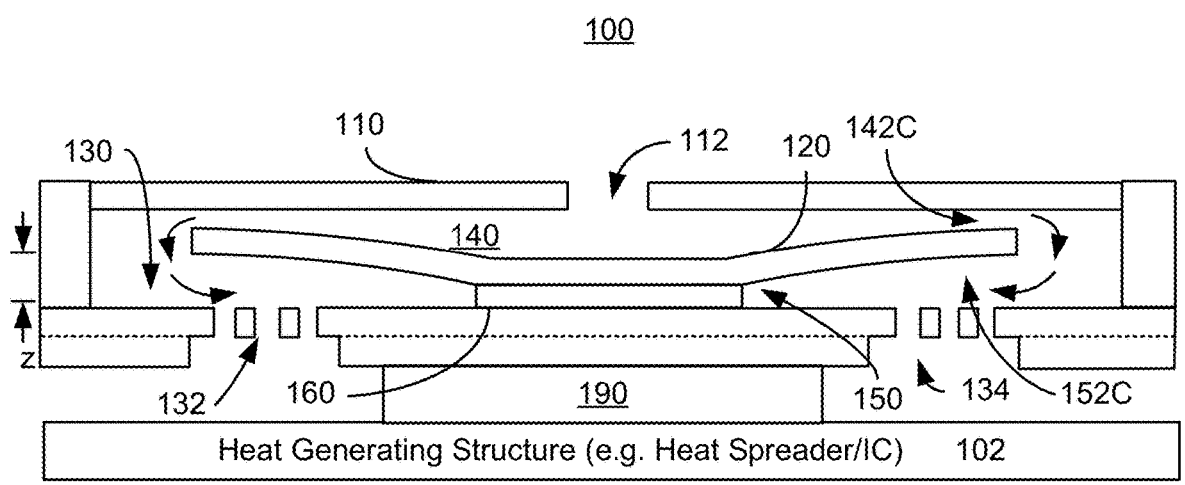
Figure 1E:
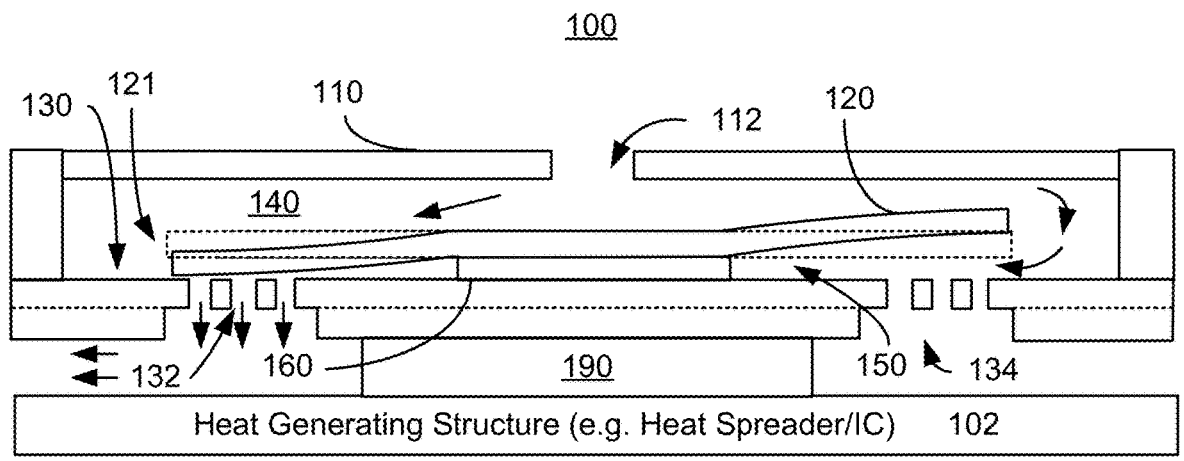
Figure 1F:
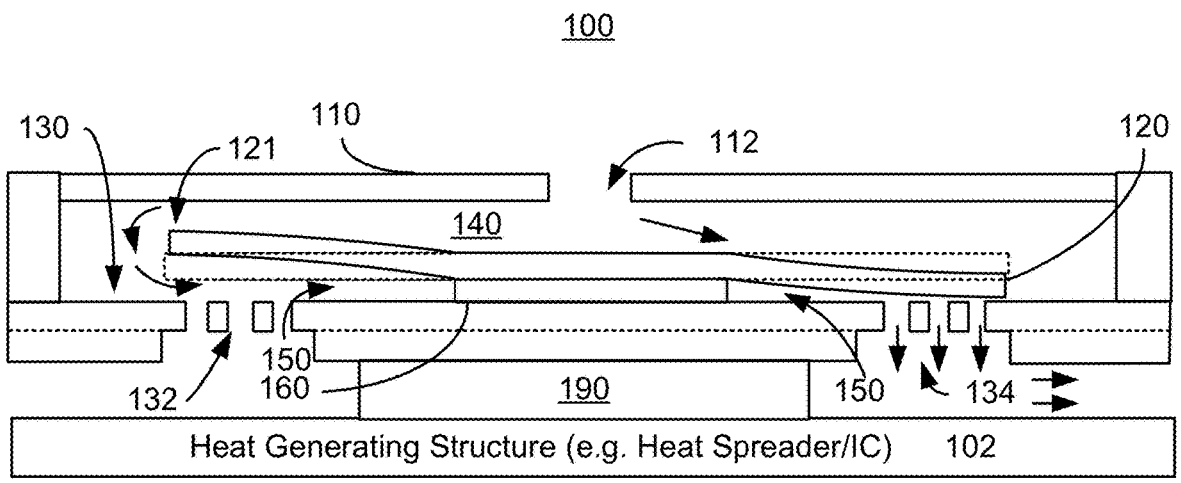
Figure 1G:
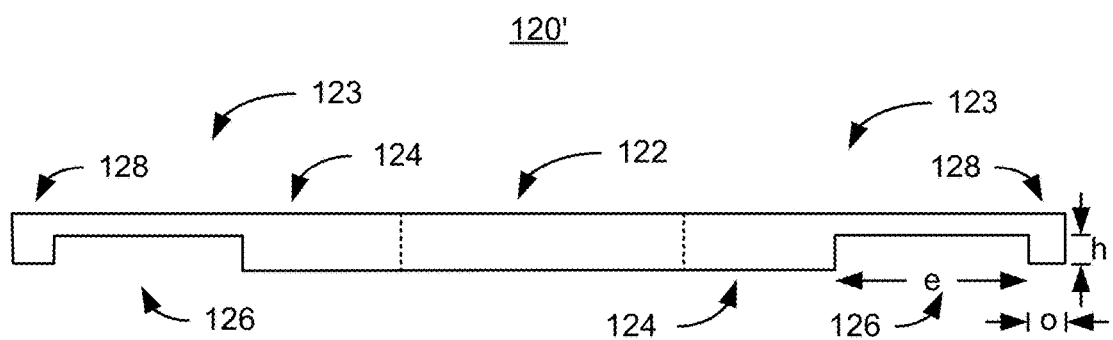

FIGS. 1A-1G are diagrams depicting an exemplary embodiment of active MEMS cooling system 100 usable with heat-generating structure 102 and including a centrally anchored cooling element 120 or 120'. Although termed a cooling system, MEMS system 100 and analogous systems described herein may be considered heat transfer systems and/or fluid transfer systems. Cooling element 120 is shown in FIGS. 1A-1F and cooling element 120' is shown in FIG. 1G. For clarity, only certain components are shown. FIGS. 1A-1G are not to scale. FIGS. 1A and 1B depict cross-sectional and top views of cooling system 100 in a neutral position. FIGS. 1C-1D depict cooling system 100 during actuation for in-phase vibrational motion. FIGS. 1E-1F depict cooling system 100 during actuation for out-of-phase vibrational motion. Although shown as symmetric, cooling system 100 need not be.

Cooling system 100 includes top plate 110 having vent 112 therein, cooling element 120, orifice plate 130 having orifices 132 and cavity 134 therein, support structure (or "anchor") 160 and chambers 140 and 150 (collectively chamber 140/150) formed therein. Cooling element 120 is supported at its central region by anchor 160. Although termed a cooling element with respect to FIGS. 1A-1G, cooling element 120 and analogous elements described herein may also be considered actuators, a vibrating elements, vibrating components, active components, and/or other terms indicating that the element is configured to undergo vibrational motion when activated (or energized) and/or to drive fluid through a system. Regions of cooling element 120 closer to and including portions of the cooling element's perimeter (e.g. tip 121) vibrate when actuated. In some embodiments, tip 121 of cooling element 120 includes a portion of the perimeter furthest from anchor 160 and undergoes the largest deflection during actuation of cooling element 120. For clarity, only one tip 121 of cooling element 120 is labeled in FIG. 1A. Also shown is pedestal 190 that connects orifice plate 130 to and offsets orifice plate 130 from heat-generating structure 102. In some embodiments, pedestal 190 also thermally couples orifice plate 130 to heat-generating structure 102. In some embodiments, an additional jet channel plate may be present and supported by pedestal 190. Thus orifice plate 130 and/or such a jet channel plate may be part or all of a bottom plate supported by pedestal 190. Thus, multiple plates and/or plate(s) having various structures may be used at the bottom plate for cooling system 100.

FIG. 1A depicts cooling system 100 in a neutral position. Thus, cooling element 120 is shown as substantially flat. For in-phase operation, cooling element 120 is driven to vibrate between positions shown in FIGS. 1C and 1D. This vibrational motion draws fluid (e.g. air) into vent 112, through chambers 140 and 150 and out orifices 132 at high speed and/or flow rates. For example, the speed at which the fluid impinges on heat-generating structure 102 may be at least thirty meters per second. In some embodiments, the fluid is driven by cooling element 120 toward heat-generating structure 102 at a speed of at least forty-five meters per second. In some embodiments, the fluid is driven toward heat-generating structure 102 by cooling element 120 at speeds of at least sixty meters per second. Other speeds may be possible in some embodiments. Cooling system 100 is also configured so that little or no fluid is drawn back into chamber 140/150 through orifices 132 by the vibrational motion of cooling element 120.

Heat-generating structure 102 is desired to be cooled by cooling system 100. In some embodiments, heat-generating structure 102 generates heat. For example, heat-generating structure may be an integrated circuit. In some embodiments, heat-generating structure 102 is desired to be cooled but does not generate heat itself. Heat-generating structure 102 may conduct heat (e.g. from a nearby object that generates heat). For example, heat-generating structure 102 might be a heat spreader or a vapor chamber. Thus, heat-generating structure 102 may include semiconductor component(s) including individual integrated circuit components such as processors, other integrated circuit(s) and/or chip package(s); sensor(s); optical device(s); one or more batteries; other component(s) of an electronic device such as a computing device; heat spreaders; heat pipes; other electronic component(s) and/or other device(s) desired to be cooled. In some embodiments, heat-generating structure 102 may be a thermally conductive part of a module containing cooling system 100. For example, cooling system 100 may be affixed to heat-generating structure 102, which may be coupled to another heat sink, vapor chamber, integrated circuit, or other separate structure desired to be cooled.

The devices in which cooling system 100 is desired to be used may also have limited space in which to place a cooling system. For example, cooling system 100 may be used in computing devices. Such computing devices may include but are not limited to smartphones, tablet computers, laptop computers, tablets, two-in-one laptops, hand held gaming systems, digital cameras, virtual reality headsets, augmented reality headsets, mixed reality headsets and other devices that are thin. Cooling system 100 may be a micro-electro-mechanical system (MEMS) cooling system capable of residing within mobile computing devices and/or other devices having limited space in at least one dimension. For example, the total height, h3, of cooling system 100 (from the top of heat-generating structure 102 to the top of top plate 110) may be less than 2 millimeters. In some embodiments, the total height of cooling system 100 is not more than 1.5 millimeters. In some embodiments, this total height is not more than 1.1 millimeters. In some embodiments, the total height does not exceed one millimeter. In some embodiments, the total height does not exceed two hundred and fifty micrometers. Similarly, the distance between the bottom of orifice plate 130 and the top of heat-generating structure 102, y, may be small. In some embodiments, y is at least two hundred micrometers and not more than 1.2 millimeter. For example, y may be at least two hundred and fifty micrometers and not more than three hundred micrometers. In some embodiments, y is at least five hundred micrometers and not more than one millimeter. In some embodiments, y is at least two hundred micrometers and not more than three hundred micrometers. Thus, cooling system 100 is usable in computing devices and/or other devices having limited space in at least one dimension. However, nothing prevents the use of cooling system 100 in devices having fewer limitations on space and/or for purposes other than cooling. Although one cooling system 100 is shown (e.g. one cooling cell), multiple cooling systems 100 might be used in connection with heat-generating structure 102. For example, a one or two-dimensional array of cooling cells might be utilized.

Cooling system 100 is in communication with a fluid used to cool heat-generating structure 102. The fluid may be a gas or a liquid. For example, the fluid may be air. In some embodiments, the fluid includes fluid from outside of the device in which cooling system 100 resides (e.g. provided through external vents in the device). In some embodiments, the fluid circulates within the device in which cooling system 100 resides (e.g. in an enclosed device).

Cooling element 120 can be considered to divide the interior of active MEMS cooling system 100 into top chamber 140 and bottom chamber 150. Top chamber 140 is formed by cooling element 120, the sides, and top plate 110. Bottom chamber 150 is formed by orifice plate 130, the sides, cooling element 120 and anchor 160. Top chamber 140 and bottom chamber 150 are connected at the periphery of cooling element 120 and together form chamber 140/150 (e.g. an interior chamber of cooling system 100).

The size and configuration of top chamber 140 may be a function of the cell (cooling system 100) dimensions, cooling element 120 motion, and the frequency of operation. Top chamber 140 has a height, h1. The height of top chamber 140 may be selected to provide sufficient pressure to drive the fluid to bottom chamber 150 and through orifices 132 at the desired flow rate and/or speed. Top chamber 140 is also sufficiently tall that cooling element 120 does not contact top plate 110 when actuated. In some embodiments, the height of top chamber 140 is at least fifty micrometers and not more than five hundred micrometers. In some embodiments, top chamber 140 has a height of at least two hundred and not more than three hundred micrometers.

Bottom chamber 150 has a height, h2. In some embodiments, the height of bottom chamber 150 is sufficient to accommodate the motion of cooling element 120. Thus, no portion of cooling element 120 contacts orifice plate 130 during normal operation. Bottom chamber 150 is generally smaller than top chamber 140 and may aid in reducing the backflow of fluid into orifices 132. In some embodiments, the height of bottom chamber 150 is the maximum deflection of cooling element 120 plus at least five micrometers and not more than ten micrometers. In some embodiments, the deflection of cooling element 120 (e.g. the deflection of tip 121), z, has an amplitude of at least ten micrometers and not more than one hundred micrometers. In some such embodiments, the amplitude of deflection of cooling element 120 is at least ten micrometers and not more than sixty micrometers. However, the amplitude of deflection of cooling element 120 depends on factors such as the desired flow rate through cooling system 100 and the configuration of cooling system 100. Thus, the height of bottom chamber 150 generally depends on the flow rate through and other components of cooling system 100.

Top plate 110 includes vent 112 through which fluid may be drawn into cooling system 100. Top vent 112 may have a size chosen based on the desired acoustic pressure in chamber 140. For example, in some embodiments, the width, w, of vent 112 is at least five hundred micrometers and not more than one thousand micrometers. In some embodiments, the width of vent 112 is at least two hundred fifty micrometers and not more than two thousand micrometers. In the embodiment shown, vent 112 is a centrally located aperture in top plate 110. In other embodiments, vent 112 may be located elsewhere. For example, vent 112 may be closer to one of the edges of top plate 110. Vent 112 may have a circular, rectangular, or other shaped footprint. Although a single vent 112 is shown, multiple vents might be used. For example, vents may be offset toward the edges of top chamber 140 or be located on the side(s) of top chamber 140. Although top plate 110 is shown as substantially flat, in some embodiments trenches and/or other structures may be provided in top plate 110 to modify the configuration of top chamber 140 and/or the region above top plate 110.

Anchor (support structure) 160 supports cooling element 120 at the central portion of cooling element 120. Thus, at least part of the perimeter of cooling element 120 is unpinned and free to vibrate. In some embodiments, anchor 160 extends along a central axis of cooling element 120 (e.g. perpendicular to the page in FIGS. 1A-1F). In such embodiments, portions of cooling element 120 that vibrate (e.g.

including tip 121) move in a cantilevered fashion. Thus, portions of cooling element 120 may move in a manner analogous to the wings of a butterfly (i.e. in phase) and/or analogous to a see-saw (i.e. out of phase). Thus, the portions of cooling element 120 that vibrate in a cantilevered fashion do so in phase in some embodiments and out of phase in other embodiments. In some embodiments, anchor 160 does not extend along an axis of cooling element 120. In such embodiments, all portions of the perimeter of cooling element 120 are free to vibrate (e.g. analogous to a jellyfish). In the embodiment shown, anchor 160 supports cooling element 120 from the bottom of cooling element 120. In other embodiments, anchor 160 may support cooling element 120 in another manner. For example, anchor 160 may support cooling element 120 from the top (e.g. cooling element 120 hangs from anchor 160). In some embodiments, the width, a, of anchor 160 is at least 0.5 millimeters and not more than four millimeters. In some embodiments, the width of anchor 160 is at least two millimeters and not more than 2.5 millimeters. Anchor 160 may occupy at least ten percent and not more than fifty percent of cooling element 120.

Cooling element 120 has a first side distal from heat-generating structure 102 and a second side proximate to heat-generating structure 102. In the embodiment shown in FIGS. 1A-1F, the first side of cooling element 120 is the top of cooling element 120 (closer to top plate 110) and the second side is the bottom of cooling element 120 (closer to orifice plate 130). Cooling element 120 is actuated to undergo vibrational motion as shown in FIGS. 1A-1F. The vibrational motion of cooling element 120 drives fluid from the first side of cooling element 120 distal from heat-generating structure 102 (e.g. from top chamber 140) to a second side of cooling element 120 proximate to heat-generating structure 102 (e.g. to bottom chamber 150). The vibrational motion of cooling element 120 also draws fluid through vent 112 and into top chamber 140; forces fluid from top chamber 140 to bottom chamber 150; and drives fluid from bottom chamber 150 through orifices 132 of orifice plate 130. Thus, cooling element 120 may be viewed as an actuator. Although described in the context of a single, continuous cooling element, in some embodiments, cooling element 120 may be formed by two (or more) cooling elements. Each of the cooling elements is depicted as one portion pinned (e.g. supported by support structure 160) and an opposite portion unpinned. Thus, a single, centrally supported cooling element 120 may be formed by a combination of multiple cooling elements supported at an edge.

Cooling element 120 has a length, L, that depends upon the frequency at which cooling element 120 is desired to vibrate. In some embodiments, the length of cooling element 120 is at least four millimeters and not more than ten millimeters. In some such embodiments, cooling element 120 has a length of at least six millimeters and not more than eight millimeters. The depth of cooling element 120 (e.g. perpendicular to the plane shown in FIGS. 1A-1F) may vary from one fourth of L through twice L. For example, cooling element 120 may have the same depth as length. The thickness, t, of cooling element 120 may vary based upon the configuration of cooling element 120 and/or the frequency at which cooling element 120 is desired to be actuated. In some embodiments, the cooling element thickness is at least two hundred micrometers and not more than three hundred and fifty micrometers for cooling element 120 having a length of eight millimeters and driven at a frequency of at least twenty kilohertz and not more than twenty-five kilohertz. The length, C, of chamber 140/150 is close to the length, L, of cooling element 120. For example, in some embodiments, the distance, d, between the edge of cooling element 120 and the wall of chamber 140/150 is at least one hundred micrometers and not more than five hundred micrometers. In some embodiments, d is at least two hundred micrometers and not more than three hundred micrometers.

Cooling element 120 may be driven at a frequency that is at or near both the resonant frequency for an acoustic resonance of a pressure wave of the fluid in top chamber 140 and the resonant frequency for a structural resonance of cooling element 120. The portion of cooling element 120 undergoing vibrational motion is driven at or near resonance (the "structural resonance") of cooling element 120. This portion of cooling element 120 undergoing vibration may be a cantilevered section in some embodiments. The frequency of vibration for structural resonance is termed the structural resonant frequency. Use of the structural resonant frequency in driving cooling element 120 reduces the power consumption of cooling system 100. Cooling element 120 and top chamber 140 may also be configured such that this structural resonant frequency corresponds to a resonance in a pressure wave in the fluid being driven through top chamber 140 (the acoustic resonance of top chamber 140). The frequency of such a pressure wave is termed the acoustic resonant frequency. At acoustic resonance, a node in pressure occurs near vent 112 and an antinode in pressure occurs near the periphery of cooling system 100 (e.g. near tip 121 of cooling element 120 and near the connection between top chamber 140 and bottom chamber 150). The distance between these two regions is C/2. Thus, $C/2=n\lambda/4$, where $\lambda$ is the acoustic wavelength for the fluid and n is odd (e.g. n=1, 3, 5, etc.). For the lowest order mode, $C=\lambda/2$. Because the length of chamber 140 (e.g. C) is close to the length of cooling element 120, in some embodiments, it is also approximately true that $L/2=n\lambda/4$, where $\lambda$ is the acoustic wavelength for the fluid and n is odd. Thus, the frequency at which cooling element 120 is driven, $v$, is at or near the structural resonant frequency for cooling element 120. The frequency $v$ is also at or near the acoustic resonant frequency for at least top chamber 140. The acoustic resonant frequency of top chamber 140 generally varies less dramatically with parameters such as temperature and size than the structural resonant frequency of cooling element 120. Consequently, in some embodiments, cooling element 120 may be driven at (or closer to) a structural resonant frequency rather than to the acoustic resonant frequency.

Orifice plate 130 has orifices 132 and cavities 134 therein. Although a particular number and distribution of orifices 132 are shown, another number and/or another distribution may be used. Cavities 134 may be configured differently or may be omitted. A single orifice plate 130 is used for a single cooling system 100. In other embodiments, multiple cooling systems 100 may share an orifice plate. For example, multiple cells 100 may be provided together in a desired configuration. In such embodiments, the cells 100 may be the same size and configuration or different size(s) and/or configuration(s). Orifices 132 are shown as having an axis oriented normal to a surface of heat-generating structure 102. In other embodiments, the axis of one or more orifices 132 may be at another angle. For example, the angle of the axis may be selected from substantially zero degrees and a nonzero acute angle. Orifices 132 also have sidewalls that are substantially parallel to the normal to the surface of orifice plate 130. In some embodiments, orifices may have sidewalls at a nonzero angle to the normal to the surface of orifice plate 130. For example, orifices 132 may be cone-shaped. Further, although orifice place 130 is shown as substantially flat, in some embodiments, trenches and/or other structures may be provided in orifice plate 130 to modify the configuration of bottom chamber 150 and/or the region between orifice plate 130 and heat-generating structure 102.

The size, distribution, and locations of orifices 132 are chosen to control the flow rate of fluid driven to the surface of heat-generating structure 102. The locations and configurations of orifices 132 may be configured to increase/maximize the fluid flow from bottom chamber 150 through orifices 132 to the jet channel (the region between the bottom of orifice plate 130 and the top of heat-generating structure 102). The locations and configurations of orifices 132 may also be selected to reduce/minimize the suction flow (e.g. back flow) from the jet channel through orifices 132. For example, the locations of orifices are desired to be sufficiently far from tip 121 that suction in the upstroke of cooling element 120 (tip 121 moves away from orifice plate 130) that would pull fluid into bottom chamber 150 through orifices 132 is reduced. The locations of orifices are also desired to be sufficiently close to tip 121 that suction in the upstroke of cooling element 120 also allows a higher pressure from top chamber 140 to push fluid from top chamber 140 into bottom chamber 150. In some embodiments, the ratio of the flow rate from top chamber 140 into bottom chamber 150 to the flow rate from the jet channel through orifices 132 in the upstroke (the "net flow ratio") is greater than 2:1. In some embodiments, the net flow ratio is at least 85:15. In some embodiments, the net flow ratio is at least 90:10. In order to provide the desired pressure, flow rate, suction, and net flow ratio, orifices 132 are desired to be at least a distance, r1, from tip 121 and not more than a distance, r2, from tip 121 of cooling element 120. In some embodiments, r1 is at least one hundred micrometers (e.g. r1≥100 μm) and r2 is not more than one millimeter (e.g. r2≤1000 μm). In some embodiments, orifices 132 are at least two hundred micrometers from tip 121 of cooling element 120 (e.g. r1≥200 μm). In some such embodiments, orifices 132 are at least three hundred micrometers from tip 121 of cooling element 120 (e.g. r1≥300 μm). In some embodiments, orifices 132 have a width, o, of at least one hundred micrometers and not more than five hundred micrometers. In some embodiments, orifices 132 have a width of at least two hundred micrometers and not more than three hundred micrometers. In some embodiments, the orifice separation, s, is at least one hundred micrometers and not more than one millimeter. In some such embodiments, the orifice separation is at least four hundred micrometers and not more than six hundred micrometers. In some embodiments, orifices 132 are also desired to occupy a particular fraction of the area of orifice plate 130. For example, orifices 132 may cover at least five percent and not more than fifteen percent of the footprint of orifice plate 130 in order to achieve a desired flow rate of fluid through orifices 132. In some embodiments, orifices 132 cover at least eight percent and not more than twelve percent of the footprint of orifice plate 130.

In some embodiments, cooling element 120 is actuated using a piezoelectric. Thus, cooling element 120 may be a piezoelectric cooling element. Cooling element 120 may be driven by a piezoelectric that is mounted on or integrated into cooling element 120. In some embodiments, cooling element 120 is driven in another manner including but not limited to providing a piezoelectric on another structure in cooling system 100. Cooling element 120 and analogous cooling elements are referred to hereinafter as piezoelectric cooling elements though it is possible that a mechanism other than a piezoelectric might be used to drive the cooling element. In some embodiments, cooling element 120 includes a piezoelectric layer on substrate. The substrate may include or consist of stainless steel, a Ni alloy, Hastelloy, Al (e.g. an Al alloy), and/or Ti (e.g. a Ti alloy such as Ti6Al-4V). In some embodiments, a piezoelectric layer includes multiple sublayers formed as thin films on the substrate. In other embodiments, the piezoelectric layer may be a bulk layer affixed to the substrate. Such a piezoelectric cooling element 120 also includes electrodes used to activate the piezoelectric. The substrate functions as an electrode in some embodiments. In other embodiments, a bottom electrode may be provided between the substrate and the piezoelectric layer. Other layers including but not limited to seed, capping, passivation, or other layers might be included in the piezoelectric cooling element. Thus, cooling element 120 may be actuated using a piezoelectric.

In some embodiments, cooling system 100 includes chimneys (not shown) or other ducting. Such ducting provides a path for heated fluid to flow away from heat-generating structure 102. In some embodiments, ducting returns fluid to the side of top plate 110 distal from heat-generating structure 102. In some embodiments, ducting may instead direct fluid away from heat-generating structure 102 in a direction parallel to heat-generating structure 102 or perpendicular to heat-generating structure 102 but in the opposite direction (e.g. toward the bottom of the page). For a device in which fluid external to the device is used in cooling system 100, the ducting may channel the heated fluid to a vent. In such embodiments, additional fluid may be provided from an inlet vent. In embodiments, in which the device is enclosed, the ducting may provide a circuitous path back to the region near vent 112 and distal from heat-generating structure 102. Such a path allows for the fluid to dissipate heat before being reused to cool heat-generating structure 102. In other embodiments, ducting may be omitted or configured in another manner. Thus, the fluid is allowed to carry away heat from heat-generating structure 102.

Operation of cooling system 100 is described in the context of FIGS. 1A-1F. Although described in the context of particular pressures, gap sizes, and timing of flow, operation of cooling system 100 is not dependent upon the explanation herein. FIGS. 1C-1D depict in-phase operation of cooling system 100. Referring to FIG. 1C, cooling element 120 has been actuated so that its tip 121 moves away from top plate 110. FIG. 1C can thus be considered to depict the end of a down stroke of cooling element 120. Because of the vibrational motion of cooling element 120, gap 152 for bottom chamber 150 has decreased in size and is shown as gap 152B. Conversely, gap 142 for top chamber 140 has increased in size and is shown as gap 142B. During the down stroke, a lower (e.g. minimum) pressure is developed at the periphery when cooling element 120 is at the neutral position. As the down stroke continues, bottom chamber 150 decreases in size and top chamber 140 increases in size as shown in FIG. 1C. Thus, fluid is driven out of orifices 132 in a direction that is at or near perpendicular to the surface of orifice plate 130 and/or the top surface of heat-generating structure 102. The fluid is driven from orifices 132 toward heat-generating structure 102 at a high speed, for example in excess of thirty-five meters per second. In some embodiments, the fluid then travels along the surface of heat-generating structure 102 and toward the periphery of heat-generating structure 102, where the pressure is lower than near orifices 132. Also in the down stroke, top chamber 140 increases in size and a lower pressure is present in top chamber 140. As a result, fluid is drawn into top chamber 140 through vent 112. The motion of the fluid into vent 112, through orifices 132, and along the surface of heat-generating structure 102 is shown by unlabeled arrows in FIG. 1C.

Cooling element 120 is also actuated so that tip 121 moves away from heat-generating structure 102 and toward top plate 110. FIG. 1D can thus be considered to depict the end of an up stroke of cooling element 120. Because of the motion of cooling element 120, gap 142 has decreased in size and is shown as gap 142C. Gap 152 has increased in size and is shown as gap 152C. During the upstroke, a higher (e.g. maximum) pressure is developed at the periphery when cooling element 120 is at the neutral position. As the upstroke continues, bottom chamber 150 increases in size and top chamber 140 decreases in size as shown in FIG. 1D. Thus, the fluid is driven from top chamber 140 (e.g. the periphery of chamber 140/150) to bottom chamber 150. Thus, when tip 121 of cooling element 120 moves up, top chamber 140 serves as a nozzle for the entering fluid to speed up and be driven towards bottom chamber 150. The motion of the fluid into bottom chamber 150 is shown by unlabeled arrows in FIG. 1D. The location and configuration of cooling element 120 and orifices 132 are selected to reduce suction and, therefore, back flow of fluid from the jet channel (between heat-generating structure 102 and orifice plate 130) into orifices 132 during the upstroke. Thus, cooling system 100 is able to drive fluid from top chamber 140 to bottom chamber 150 without an undue amount of backflow of heated fluid from the jet channel entering bottom chamber 150. Moreover, cooling system 100 may operate such that fluid is drawn in through vent 112 and driven out through orifices 132 without cooling element 120 contacting top plate 110 or orifice plate 130. Thus, pressures are developed within chambers 140 and 150 that effectively open and close vent 112 and orifices 132 such that fluid is driven through cooling system 100 as described herein.

The motion between the positions shown in FIGS. 1C and 1D is repeated. Thus, cooling element 120 undergoes vibrational motion indicated in FIGS. 1A-1D, drawing fluid through vent 112 from the distal side of top plate 110 into top chamber 140; transferring fluid from top chamber 140 to bottom chamber 150; and pushing the fluid through orifices 132 and toward heat-generating structure 102. As discussed above, cooling element 120 is driven to vibrate at or near the structural resonant frequency of cooling element 120. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at frequencies from 15 kHz through 30 kHz. In some embodiments, cooling element 120 vibrates at a frequency/frequencies of at least 20 kHz and not more than 30 kHz. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 may move substantially normal (perpendicular) to the top surface of heat-generating structure 102. In some embodiments, the fluid motion may have a nonzero acute angle with respect to the normal to the top surface of heat-generating structure 102. In either case, the fluid may thin and/or form apertures in the boundary layer of fluid at heat-generating structure 102. As a result, transfer of heat from heat-generating structure 102 may be improved. The fluid deflects off of heat-generating structure 102, traveling along the surface of heat-generating structure 102. In some embodiments, the fluid moves in a direction substantially parallel to the top of heat-generating structure 102. Thus, heat from heat-generating structure 102 may be extracted by the fluid. The fluid may exit the region between orifice plate 130 and heat-generating structure 102 at the edges of cooling system 100. Chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to the distal side of top plate 110 after cooling. In other embodiments, heated fluid is carried away and replaced by new fluid at the distal side of cooling element 120. As a result, heat-generating structure 102 may be cooled.

FIGS. 1E-1F depict an embodiment of active MEMS cooling system 100 including centrally anchored cooling element 120 in which the cooling element is driven out-of-phase. More specifically, sections of cooling element 120 on opposite sides of anchor 160 (and thus on opposite sides of the central region of cooling element 120 that is supported by anchor 160) are driven to vibrate out-of-phase. In some embodiments, sections of cooling element 120 on opposite sides of anchor 160 are driven at or near one hundred and eighty degrees out-of-phase. Thus, one section of cooling element 120 vibrates toward top plate 110, while the other section of cooling element 120 vibrates toward orifice plate 130/heat-generating structure 102. Movement of a section of cooling element 120 toward top plate 110 (an upstroke) drives fluid in top chamber 140 to bottom chamber 150 on that side of anchor 160. Movement of a section of cooling element 120 toward orifice plate 130 drives fluid through orifices 132 and toward heat-generating structure 102. Thus, fluid traveling at high speeds (e.g. speeds described with respect to in-phase operation) is alternately driven out of orifices 132 on opposing sides of anchor 160. Because fluid is driven through orifices 132 at high speeds, cooling system 100 may be viewed as a MEMs jet. The movement of fluid is shown by unlabeled arrows in FIGS. 1E and 1F. The motion between the positions shown in FIGS. 1E and 1F is repeated. Thus, cooling element 120 undergoes vibrational motion indicated in FIGS. 1A, 1E, and 1F, alternately drawing fluid through vent 112 from the distal side of top plate 110 into top chamber 140 for each side of cooling element 120; transferring fluid from each side of top chamber 140 to the corresponding side of bottom chamber 150; and pushing the fluid through orifices 132 on each side of anchor 160 and toward heat-generating structure 102. As discussed above, cooling element 120 is driven to vibrate at or near the structural resonant frequency of cooling element 120. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at the frequencies described for in-phase vibration. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 for out-of-phase vibration may move substantially normal (perpendicular) to the top surface of heat-generating structure 102, in a manner analogous to that described above for in-phase operation. Similarly, chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to the distal side of top plate 110 after cooling. In other embodiments, heated fluid is carried away and replaced by new fluid at the distal side of cooling element 120. As a result, heat-generating structure 102 may be cooled.

Although shown in the context of a uniform cooling element in FIGS. 1A-1F, cooling system 100 may utilize cooling elements having different shapes. FIG. 1G depicts an embodiment of engineered cooling element 120' having a tailored geometry and usable in a cooling system such as cooling system 100. Cooling element 120' includes an anchored region 122 and cantilevered arms 123. Anchored region 122 is supported (e.g. held in place) in cooling system 100 by anchor 160. Cantilevered arms 123 undergo vibrational motion in response to cooling element 120' being actuated. Each cantilevered arm 123 includes step region 124, extension region 126 and outer region 128. In the embodiment shown in FIG. 1G, anchored region 122 is centrally located. Step region 124 extends outward from anchored region 122. Extension region 126 extends outward from step region 124. Outer region 128 extends outward from extension region 126. In other embodiments, anchored region 122 may be at one edge of the actuator and outer region 128 at the opposing edge. In such embodiments, the actuator is edge anchored.

Extension region 126 has a thickness (extension thickness) that is less than the thickness of step region 124 (step thickness) and less than the thickness of outer region 128 (outer thickness). Thus, extension region 126 may be viewed as recessed. Extension region 126 may also be seen as providing a larger bottom chamber 150. In some embodiments, the outer thickness of outer region 128 is the same as the step thickness of step region 124. In some embodiments, the outer thickness of outer region 128 is different from the step thickness of step region 124. In some embodiments, outer region 128 and step region 124 each have a thickness of at least three hundred twenty micrometers and not more than three hundred and sixty micrometers. In some embodiments, the outer thickness is at least fifty micrometers and not more than two hundred micrometers thicker than the extension thickness. Stated differently, the step (difference in step thickness and extension thickness) is at least fifty micrometers and not more than two hundred micrometers. In some embodiments, the outer step (difference in outer thickness and extension thickness) is at least fifty micrometers and not more than two hundred micrometers. Outer region 128 may have a width, o, of at least one hundred micrometers and not more than three hundred micrometers. Extension region 126 has a length, e, extending outward from the step region of at least 0.5 millimeter and not more than 1.5 millimeters in some embodiments. In some embodiments, outer region 128 has a higher mass per unit length in the direction from anchored region 122 than extension region 126. This difference in mass may be due to the larger size of outer region 128, a difference in density between portions of cooling element 120, and/or another mechanism.

Use of engineered cooling element 120' may further improve efficiency of cooling system 100. Extension region 126 is thinner than step region 124 and outer region 128. This results in a cavity in the bottom of cooling element 120' corresponding to extension region 126. The presence of this cavity aids in improving the efficiency of cooling system 100. Each cantilevered arm 123 vibrates towards top plate 110 in an upstroke and away from top plate 110 in a downstroke. When a cantilevered arm 123 moves toward top plate 110, higher pressure fluid in top chamber 140 resists the motion of cantilevered arm 123. Furthermore, suction in bottom chamber 150 also resists the upward motion of cantilevered arm 123 during the upstroke. In the downstroke of cantilevered arm 123, increased pressure in the bottom chamber 150 and suction in top chamber 140 resist the downward motion of cantilevered arm 123. However, the presence of the cavity in cantilevered arm 123 corresponding to extension region 126 mitigates the suction in bottom chamber 150 during an upstroke. The cavity also reduces the increase in pressure in bottom chamber 150 during a downstroke. Because the suction and pressure increase are reduced in magnitude, cantilevered arms 123 may more readily move through the fluid. This may be achieved while substantially maintaining a higher pressure in top chamber 140, which drives the fluid flow through cooling system 100. Moreover, the presence of outer region 128 may improve the ability of cantilevered arm 123 to move through the fluid being driven through cooling system 100. Outer region 128 has a higher mass per unit length and thus a higher momentum. Consequently, outer region 128 may improve the ability of cantilevered arms 123 to move through the fluid being driven through cooling system 100. The magnitude of the deflection of cantilevered arm 123 may also be increased. These benefits may be achieved while maintaining the stiffness of cantilevered arms 123 through the use of thicker step region 124. Further, the larger thickness of outer region 128 may aid in pinching off flow at the bottom of a downstroke. Thus, the ability of cooling element 120' to provide a valve preventing backflow through orifices 132 may be improved. Thus, performance of cooling system 100 employing cooling element 120' may be improved.

Further, cooling elements used in cooling system 100 may have different structures and/or be mounted differently than depicted in FIGS. 1A-1G. In some embodiments, the cooling element may have rounded corners and/or rounded ends but still be anchored along a central axis such that cantilevered arms vibrate. The cooling element may be anchored only at its central region such that the regions surrounding the anchor vibrate in a manner analogous to a jellyfish or the opening/closing of an umbrella. In some such embodiments, the cooling element may be circular or elliptical in shape. In some embodiments, the anchor may include apertures through which fluid may flow. Such an anchor may be utilized for the cooling element being anchored at its top (e.g. to the top plate). Although not indicated in FIGS.

1A-1G, the piezoelectric utilized in driving the cooling element may have various locations and/or configurations. For example, the piezoelectric may be embedded in the cooling element, affixed to one side of the cooling element (or cantilevered arm(s)), may occupy some or all of the cantilevered arms, and/or may have a location that is close to or distal from the anchored region. In some embodiments, cooling elements that are not centrally anchored may be used. For example, a pair of cooling elements that have offset apertures, that are anchored at their ends (or all edges), and which vibrate out of phase may be used. Thus, various additional configurations of cooling element 120 and/or 120', anchor 160, and/or other portions of cooling system 100 may be used.

Using the cooling system 100 actuated for in-phase vibration or out-of-phase vibration of cooling element 120 and/or 120', fluid drawn in through vent 112 and driven through orifices 132 may efficiently dissipate heat from heat-generating structure 102. Because fluid impinges upon the heat-generating structure with sufficient speed (e.g. at least thirty meters per second) and in some embodiments substantially normal to the heat-generating structure, the boundary layer of fluid at the heat-generating structure may be thinned and/or partially removed. Consequently, heat transfer between heat-generating structure 102 and the moving fluid is improved. Because the heat-generating structure is more efficiently cooled, the corresponding integrated circuit may be run at higher speed and/or power for longer times. For example, if the heat-generating structure corresponds to a high-speed processor, such a processor may be run for longer times before throttling. Thus, performance of a device utilizing cooling system 100 may be improved. Further, cooling system 100 may be a MEMS device. Consequently, cooling systems 100 may be suitable for use in smaller and/or mobile devices, such as smart phones, other mobile phones, virtual reality headsets, tablets, two-in-one computers, wearables, and handheld games, in which limited space is available. Performance of such devices may thus be improved. Because cooling element 120/120' may be vibrated at frequencies of 15 kHz or more, users may not hear any noise associated with actuation of cooling elements. If driven at or near structural and/or acoustic resonant frequencies, the power used in operating cooling systems may be significantly reduced. Cooling element 120/120' does not physically contact top plate 110 or orifice plate 130 during vibration. Thus, resonance of cooling element 120/120' may be more readily maintained. More specifically, physical contact between cooling element 120/120' and other structures disturbs the resonance conditions for cooling element 120/120'. Disturbing these conditions may drive cooling element 120/120' out of resonance. Thus, additional power would need to be used to maintain actuation of cooling element 120/120'. Further, the flow of fluid driven by cooling element 120/120' may decrease. These issues are avoided through the use of pressure differentials and fluid flow as discussed above. The benefits of improved, quiet cooling may be achieved with limited additional power. Further, out-of-phase vibration of cooling element 120/120' allows the position of the center of mass of cooling element 120/120' to remain more stable. Although a torque is exerted on cooling element 120/120', the force due to the motion of the center of mass is reduced or eliminated. As a result, vibrations due to the motion of cooling element 120/120' may be reduced. Moreover, efficiency of cooling system 100 may be improved through the use of out-of-phase vibrational motion for the two sides of cooling element 120/120'. Consequently, performance of devices incorporating the cooling system 100 may be improved. Further, cooling system 100 may be usable in other applications (e.g. with or without heat-generating structure 102) in which high fluid flows and/or velocities are desired.

Figure 2A:
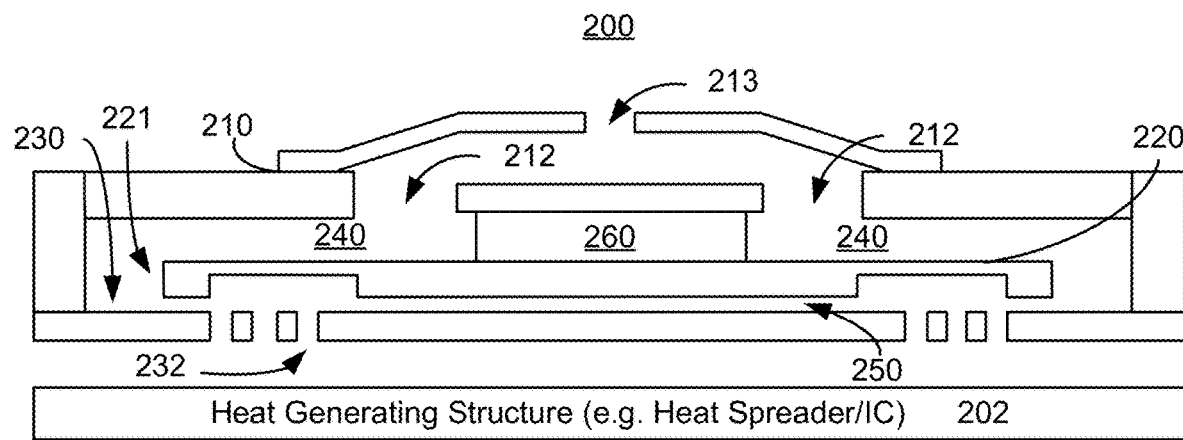
FIGS. 2A-2B depict an embodiment of an active MEMS cooling system including a centrally anchored cooling element.
Figure 2B:
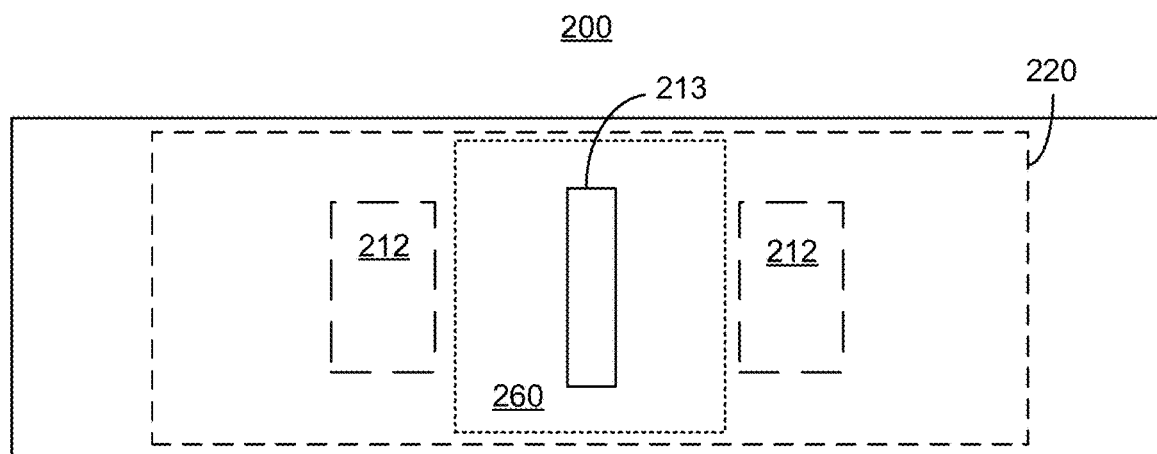

FIGS. 2A-2B depict an embodiment of active MEMS cooling system 200 including a top centrally anchored cooling element. FIG. 2A depicts a side view of cooling system 200 in a neutral position. FIG. 2B depicts a top view of cooling system 200. FIGS. 2A-2B are not to scale. For simplicity, only portions of cooling system 200 are shown. Referring to FIGS. 2A-2B, cooling system 200 is analogous to cooling system 100. Consequently, analogous components have similar labels. For example, cooling system 200 is used in conjunction with heat-generating structure 202, which is analogous to heat-generating structure 102.

Cooling system 200 includes top plate 210 having vents 212, cooling element 220 having tip 221, orifice plate 230 including orifices 232, top chamber 240 having a gap, bottom chamber 250 having a gap, flow chamber 240/250, and anchor (i.e. support structure) 260 that are analogous to top plate 110 having vent 112, cooling element 120 having tip 121, orifice plate 130 including orifices 132, top chamber 140 having gap 142, bottom chamber 150 having gap 152, flow chamber 140/150, and anchor (i.e. support structure) 160, respectively. Also shown is pedestal 290 that is analogous to pedestal 190. Thus, cooling element 220 is centrally supported by anchor 260 such that at least a portion of the perimeter of cooling element 220 is free to vibrate. In some embodiments, anchor 260 extends along the axis of cooling element 220. In other embodiments, anchor 260 is only near the center portion of cooling element 220. Although not explicitly labeled in FIGS. 2A and 2B, cooling element 220 includes an anchored region and cantilevered arms including step region, extension region, and outer regions analogous to anchored region 122, cantilevered arms 123, step region 124, extension region 126, and outer region 128 of cooling element 120'. In some embodiments, cantilevered arms of cooling element 220 are driven in-phase. In some embodiments, cantilevered arms of cooling element 220 are driven out-of-phase. In some embodiments, a simple cooling element, such as cooling element 120, may be used.

Anchor 260 supports cooling element 220 from above. Thus, cooling element 220 is suspended from anchor 260. Anchor 260 is suspended from top plate 210. Top plate 210 includes vent 213. Vents 212 on the sides of anchor 260 provide a path for fluid to flow into sides of chamber 240.

As discussed above with respect to cooling system 100, cooling element 220 may be driven to vibrate at or near the structural resonant frequency of cooling element 220. Further, the structural resonant frequency of cooling element 220 may be configured to align with the acoustic resonance of the chamber 240/250. The structural and acoustic resonant frequencies are generally chosen to be in the ultrasonic range. For example, the vibrational motion of cooling element 220 may be at the frequencies described with respect to cooling system 100. Consequently, efficiency and flow rate may be enhanced. However, other frequencies may be used.

Cooling system 200 operates in an analogous manner to cooling system 100. Cooling system 200 thus shares the benefits of cooling system 100. Thus, performance of a device employing cooling system 200 may be improved. In addition, suspending cooling element 220 from anchor 260 may further enhance performance. In particular, vibrations in cooling system 200 that may affect other cooling cells (not shown) may be reduced. For example, less vibration may be induced in top plate 210 due to the motion of cooling element 220. Consequently, cross talk between cooling system 200 and other cooling systems (e.g. other cells) or other portions of the device incorporating cooling system 200 may be reduced. Thus, performance may be further enhanced.

Figure 3A:
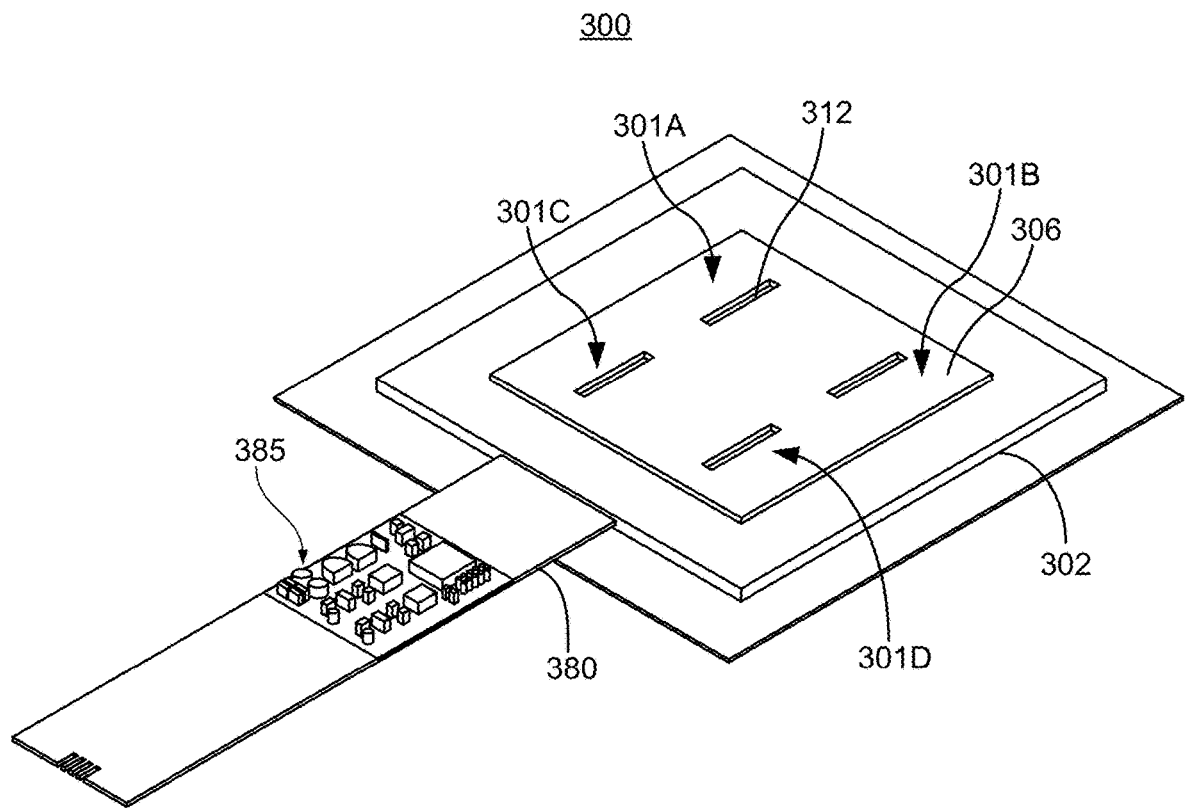
FIGS. 3A-3E depict an embodiment of an active MEMS cooling system formed in a tile.
Figure 3B:
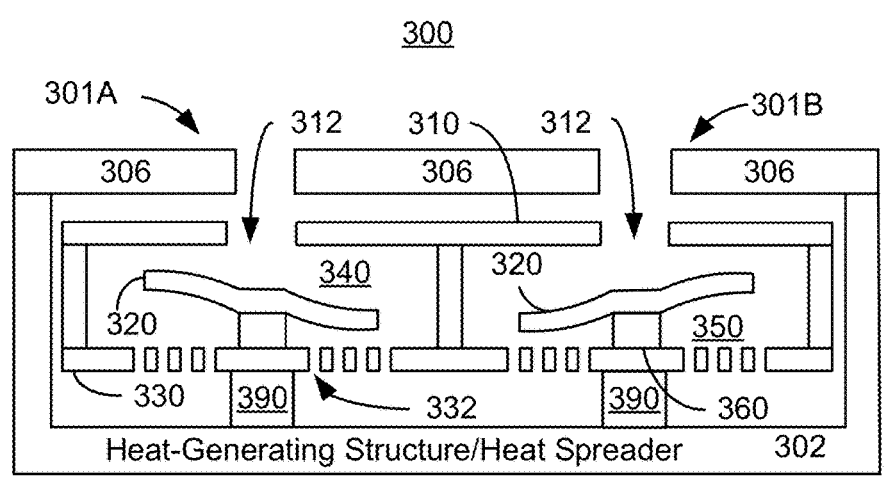
Figure 3C:
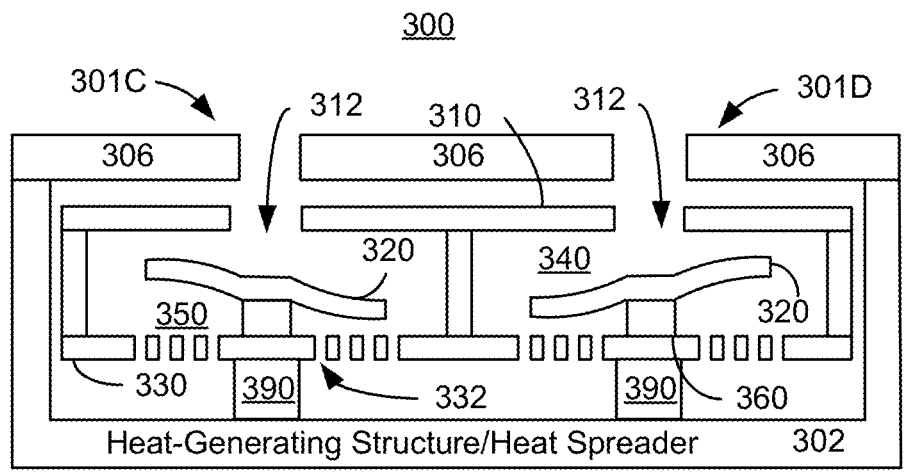
Figure 3D:
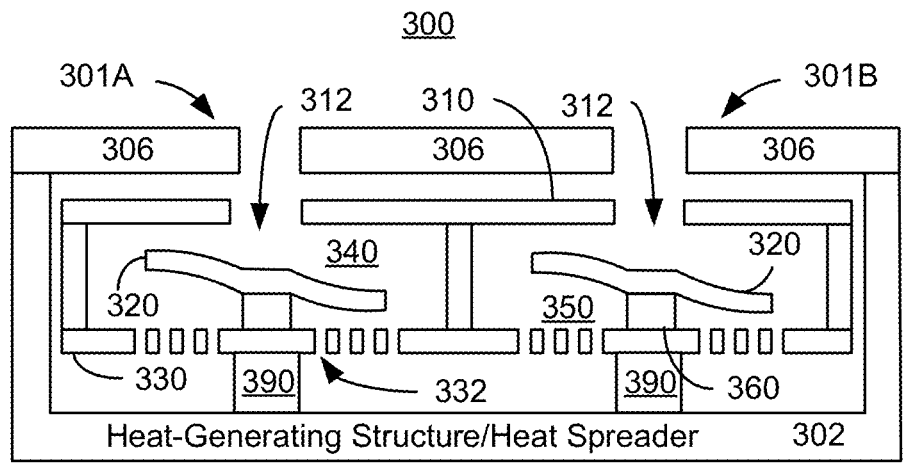
Figure 3E:
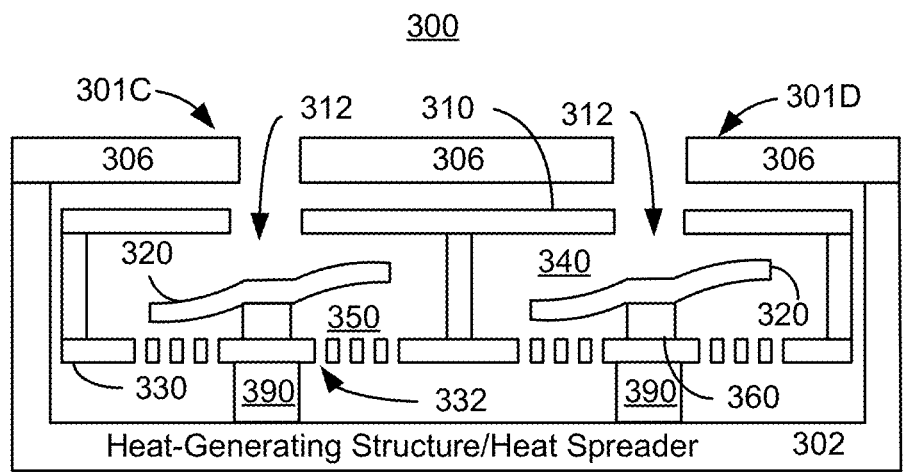

FIGS. 3A-3E depict an embodiment of active MEMS cooling system 300 including multiple cooling cells configured as a module termed a tile, or array. FIG. 3A depicts a perspective view, while FIGS. 3B-3E depict side views. FIGS. 3A-3E are not to scale. Cooling system 300 includes four cooling cells 301A, 301B, 301C and 301D (collectively or generically 301), which are analogous to one or more of cooling systems described herein. More specifically, cooling cells 301 are analogous to cooling system 100 and/or 200. Tile 300 thus includes four cooling cells 301 (i.e. four MEMS jets). Although four cooling cells 301 in a 2×2 configuration are shown, in some embodiments another number and/or another configuration of cooling cells 301 might be employed. In the embodiment shown, cooling cells 301 include shared top plate 310 having apertures 312, cooling elements 320, shared orifice plate 330 including orifices 332, top chambers 340, bottom chambers 350, anchors (support structures) 360, and pedestals 390 that are analogous to top plate 110 having apertures 112, cooling element 120, orifice plate 130 having orifices 132, top chamber 140, bottom chamber 150, anchor 160, and pedestal 190. In some embodiments, cooling cells 301 may be fabricated together and separated, for example by cutting through top plate 310, side walls between cooling cells 301, and orifice plate 330. Thus, although described in the context of a shared top plate 310 and shared orifice plate 330, after fabrication cooling cells 301 may be separated. In some embodiments, tabs (not shown) and/or other structures such as anchors 360 may connect cooling cells 301. Further, tile 300 includes heat-generating structure (termed a heat spreader hereinafter) 302 (e.g. a heat sink, a heat spreader, and/or other structure) that also has sidewalls, or fencing, in the embodiment shown. Cover plate 306 having apertures therein is also shown. Heat spreader 302 and cover plate 306 may be part of an integrated tile 300 as shown or may be separate from tile 300 in other embodiments. Heat spreader 302 and cover plate 306 may direct fluid flow outside of cooling cells 301, provide mechanical stability, and/or provide protection. Electrical connection to cooling cells 301 is provided via flex connector 380 (not shown in FIGS. 3B-5E) which may house drive electronics 385. Cooling elements 320 are driven out-of-phase (i.e. in a manner analogous to a see-saw). Further, as can be seen in FIGS. 3B-3C and FIGS. 3D-3E cooling element 320 in one cell is driven out-of-phase with cooling element(s) 320 in adjacent cell(s). In FIGS. 3B-3C, cooling elements 320 in a row are driven out-of-phase. Thus, cooling element 320 in cell 301A is out-of-phase with cooling element 320 in cell 301B. Similarly, cooling element 320 in cell 301C is out-of-phase with cooling element 320 in cell 301D. In FIGS. 3D-3E, cooling elements 320 in a column are driven out-of-phase. Thus, cooling element 320 in cell 301A is out-of-phase with cooling element 320 in cell 301C. Similarly, cooling element 320 in cell 301B is out-of-phase with cooling element 320 in cell 301D. By driving cooling elements 320 out-of-phase, vibrations in cooling system 300 may be reduced. Cooling elements 320 may be driven in another manner in some embodiments.

Cooling cells 301 of cooling system 300 function in an analogous manner to cooling system(s) 100, 200, and/or an analogous cooling system. Consequently, the benefits described herein may be shared by cooling system 300. Because cooling elements in nearby cells are driven out-of-phase, vibrations in cooling system 300 may be reduced. Because multiple cooling cells 301 are used, cooling system 300 may enjoy enhanced cooling capabilities. Further, multiples of individual cooling cells 301 and/or cooling system 300 may be combined in various fashions to obtain the desired footprint of cooling cells.

Figure 4:
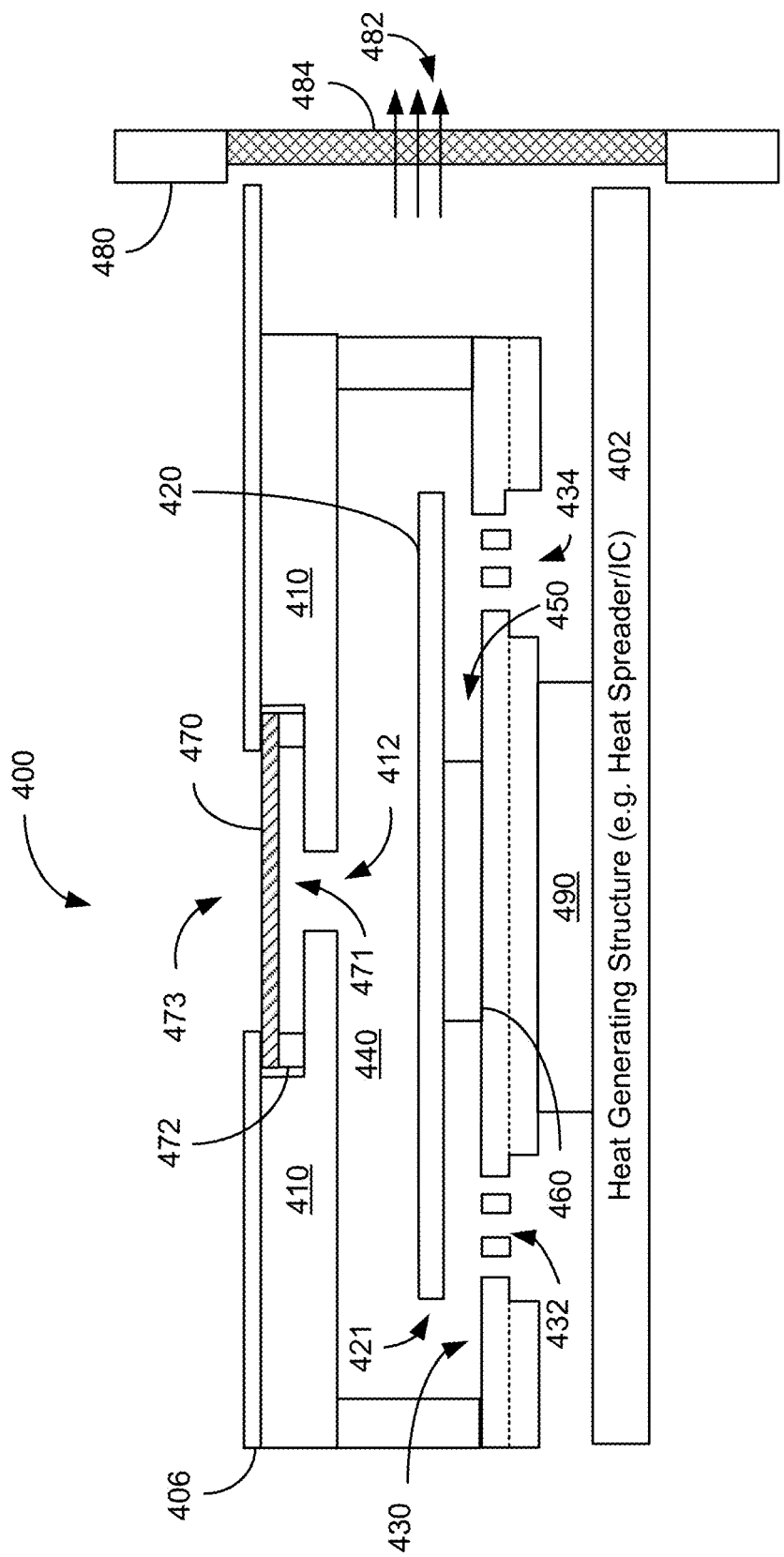
FIG. 4 depicts an embodiment of an active MEMS cooling system used in a watertight device.

FIG. 4 depicts an embodiment of active MEMS cooling system 400 used in a watertight device. MEMS cooling system 400 may also be considered to be a heat transfer or fluid transfer system. For example, transfer of the fluid by cooling system 400 removes heat from heat-generating structure 402 and from devices (e.g. processors and/or batteries) to which heat-generating structure 402 is coupled. However, for simplicity, system 400 is referred to as a cooling system. FIG. 4 is not to scale. For simplicity, only portions of cooling system 400 are shown. Cooling system 400 is analogous to cooling system(s) 100, 200, and/or 300. Consequently, analogous components have similar labels. For example, cooling system 400 is used in conjunction with heat-generating structure 402, which is analogous to heat-generating structure(s) 102, 202, and 302. In the embodiment shown, heat-generating structure 402 is a heat spreader that is integrated into system 400. Heat spreader 402 is thermally coupled with heat source(s), such as integrated circuit(s), battery/batteries, and/or components that are desired to be cooled.

Cooling system 400 includes top plate 410 having vent(s) 412 (only one of which is shown), cooling element 420 having tip 421, orifice plate 430 including orifices 432 and cavities 434, top chamber 440 having a gap, bottom chamber 450 having a gap, flow chamber 440/450, and anchor (i.e. support structure) 460 that are analogous to top plate 110 having vent 112, cooling element 120 having tip 121, orifice plate 130 including orifices 132 and cavities 134, top chamber 140 having gap 142, bottom chamber 150 having gap 152, flow chamber 140/150, and anchor (i.e. support structure) 160, respectively. Also shown is pedestal 490 that is analogous to pedestal 190. Cooling element 420 is centrally supported by anchor 460 such that at least a portion of the perimeter of cooling element 420 is free to vibrate. In some embodiments, anchor 460 extends along the axis of cooling element 220. In other embodiments, anchor 460 is only near the center portion of cooling element 420. In some embodiments, cooling element 420 is analogous to cooling element 120'. Cantilevered arms of cooling element 420 may be driven out-of-phase or in-phase. In some embodiments, cooling system 400 includes multiple cooling cells analogous to the cooling cell shown.

Cooling system 400 also includes cover 406 and membrane 470. Cover 406 is analogous to cover 306 and may include multiple layers. For example, cover 406 may include insulating layers separated by a thermally conductive layer, such as a graphite layer. The thermally conductive layer is both compliant and has high in-plane electrical thermal conductivities. Cover 406 has an aperture therein. The aperture allows for the flow of fluid (e.g. a gas such as air) into chambers 440 and 450 via vent 412. Membrane 470 reduces or prevents the entry of dust into chambers 440 and 450. In some embodiments, membrane 470 prevents at least ninety-nine percent of particles having a size of one micron or more from entering vent 412. Membrane 470 also reduces or prevents the entry of smaller particles into chambers 440 and 450. For example, membrane 470 may be or have the characteristics corresponding to a MERV14 filter. Further, membrane 470 is desired to be compliant and not overly restrict flow through cooling system 400. In some embodiments, therefore, membrane 470 is not more than three hundred micrometers thick. In some embodiments, membrane 470 is at least one hundred micrometers and not more than two hundred micrometers thick.

Flow chamber 471 has been formed in top plate 410. Flow chamber 471 has an inner wall on which support members 472 reside and which includes vent 412. The outer wall of flow chamber 471 includes opening 473. Cover 406 is on the outer wall of flow chamber 471. Membrane 470 is supported by support members 472. In some embodiments, flow chamber 471 is at least three hundred and not more than four hundred micrometers in depth for a top plate 410 having a thickness of five hundred micrometers. The bottom of membrane 470 is desired to be distal from the bottom (inner wall) of flow chamber 471. For example, in some embodiments, the bottom of membrane 470 is at least two hundred micrometers and not more than three hundred micrometers from the bottom of flow chamber 471.

FIG. 4 also depicts housing 480 for a device (e.g., a smartphone) in which cooling system 400 is incorporated. Cooling system 400 is thus in the interior of housing 480. Housing 480 includes aperture 482 therein and flow control device 484 coupled with and covering aperture 482. Flow control device 484 allows gas to flow through aperture 482, but does not allow liquid to flow through aperture 482 to the interior of housing 480. Stated differently, flow control device 484 is watertight and gas breathable. Flow control device 484 may be selected from a valve and a membrane. Flow control device 484 may be a valve that closes in response to the detection of water in proximity to aperture 482 (e.g. if the device is immersed in water). Flow control device 484 may be a one-way valve that is configured to only allow gas to egress from housing 480. In some embodiments, flow control device 484 is a membrane that is watertight and gas breathable. For example, flow control device 484 may be an IP68 membrane. For simplicity, flow control device 484 is referred to hereinafter as membrane 484. However, other structures having an analogous function may be used. When activated, active cooling system 400 drives a gas through such a membrane 484 but does not drive the water through membrane 484. Thus, gas may flow through cooling system 400 and the device in which cooling system 400 is incorporated without liquid flowing within the device.

Cooling system 400 operates in an analogous manner to cooling system 100. In some embodiments, heat from a portion of the device in which system 400 is incorporated is transferred to heat-generating structure 402 (e.g. a heat spreader) and other portions of cooling system 400 via thermal conduction. Cooling element 420 is activated to undergo vibrational motion (e.g. in a see-saw/out-of-phase configuration). The vibrational motion of cooling element 420 draws fluid (e.g. a gas such as air) into vent 412, directs the gas through flow chamber 440/450, and drives the gas out of flow chamber 440/450 via orifices 432. The gas travels through cavity 434, impinges on heat-generating structure 402, and travels via the jet channel between orifice plate 430 and heat spreader 402, and exits the device via aperture 482. The gas carries with it heat from heat-generating structure 402 as well as from other portions of cooling system 400. Consequently, cooling system 400 may efficiently transfer cool portions of the device.

To drive the gas through system 400 and out of aperture 484, the vibrational motion of cooling element 420 generates an oscillating pressure wave. Thus, the gas driven by cooling element 420 is under high pressure. The gas also exits system 400 in proximity to aperture 482. As a result, cooling system 400 also drives the gas through aperture 482, even in the presence of a barrier to flow such as a membrane 484. The flow of gas through membrane 484 is shown by unlabeled arrows in FIG. 4. Stated differently, cooling system 400 provides sufficient pressure to drive a gas through membrane 484, such as an IP68 membrane, to exit the device. Further, the gas exiting the device via aperture 482 creates a suction within the device. As a result, gas is drawn into the device (i.e. into housing 480) via an inlet (not shown in FIG. 4). The gas drawn into the device may travel through another membrane or other flow control device analogous to membrane 484. Entrance of the gas to the interior of housing 480 due to the vibrational motion of cooling element 420 does not result in liquid being drawn through a corresponding watertight/air breathable flow control device. In some embodiments, the inlet gas flows on other hot spots of the device before entering cooling system 400. This may improve the coefficient of thermal spreading for the device. Consequently, cooling system 400 may efficiently cool a device that is watertight.

Cooling system 400 shares the benefits of cooling systems 100, 200, and/or 300. Thus, fluid driven by cooling system 400 efficiently cools heat spreader 402 and, therefore, structures that are thermally coupled (e.g. via conduction) with heat spreader 402. Cooling system 400 performs this function in a device that is watertight. For example, cooling system 400 provides a gas flow of sufficiently high pressure that the gas exits through a watertight, gas (e.g. air) breathable membrane 484. Gas exiting the device aids in drawing additional gas into the device. A gas flow may be maintained through the device when cooling system 400 is activated. This gas flow does not introduce liquid into the device. Thus, active cooling of a watertight device may be facilitated. In addition, a portion of cooling system 400 (e.g. cover 406 and heat spreader 402) extends to be close to aperture 482. Gas exits cooling system 400 proximate to aperture 484. As a result, the gas is more readily directed through aperture 482. In addition to improving gas flow, this may result in less dumping of heat from the gas on portions of the device interior to housing 480. Cooling system 400 also allows for the more efficient cooling of a device that is watertight. Thus, performance of such a device may be improved.

Figure 5:
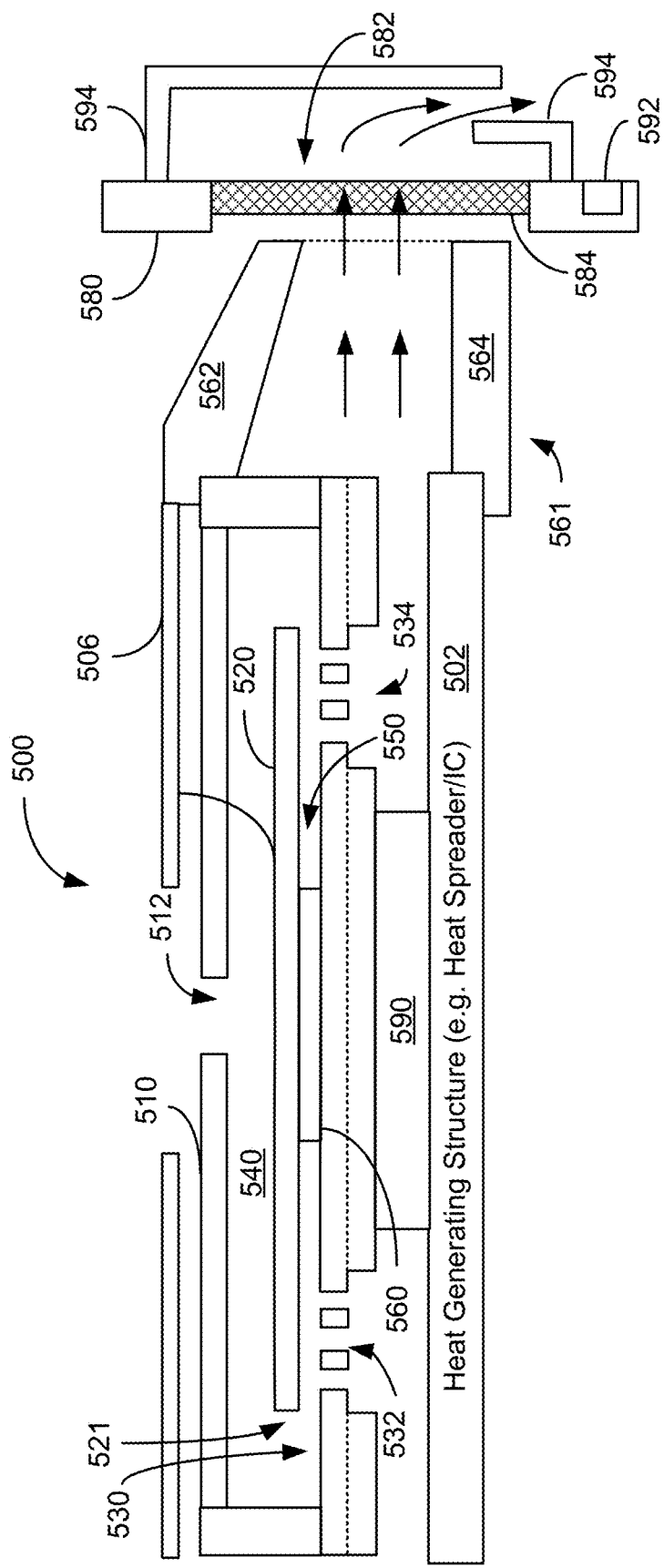
FIG. 5 depicts an embodiment of an active MEMS cooling system used in a watertight device.

FIG. 5 depicts an embodiment of active MEMS cooling system 500 used in a watertight device. MEMS cooling system 500 may also be considered to be a heat transfer or fluid transfer system. For example, transfer of the fluid by cooling system 500 removes heat from heat-generating structure 502 and from devices (e.g. processors and/or batteries) to which heat-generating structure 502 is coupled. However, for simplicity, system 500 is referred to as a cooling system. Although a single cooling cell is shown in FIG. 5, multiple cooling cells may be present. FIG. 5 is not to scale. For simplicity, only portions of cooling system 500 are shown. Cooling system 500 is analogous to cooling system(s) 100, 200, 300, and 400. Consequently, analogous components have similar labels. For example, cooling system 500 is used in conjunction with heat-generating structure 502, which is analogous to heat-generating structure(s) 102, 202, 302, and 402. In the embodiment shown, heat-generating structure 502 is a heat spreader that is integrated into system 500. Heat spreader 502 is thermally coupled with heat source(s), such as integrated circuit(s), battery/batteries, and/or components that are desired to be cooled.

Cooling system 500 includes top plate 510 having vent(s) 512 (only one of which is shown), cooling element 520 having tip 521, orifice plate 530 including orifices 532 and cavities 534, top chamber 540 having a gap, bottom chamber 550 having a gap, flow chamber 540/550, and anchor (i.e. support structure) 560 that are analogous to top plate 110 having vent 112, cooling element 120 having tip 121, orifice plate 130 including orifices 132 and cavities 134, top chamber 140 having gap 142, bottom chamber 150 having gap 152, flow chamber 140/150, and anchor (i.e. support structure) 160, respectively. Also shown is pedestal 590 that is analogous to pedestal 190. Cooling element 520 is centrally supported by anchor 560 such that at least a portion of the perimeter of cooling element 520 is free to vibrate. In some embodiments, anchor 560 extends along the axis of cooling element 220. In other embodiments, anchor 560 is only near the center portion of cooling element 520. In some embodiments, cooling element 520 is analogous to cooling element 120'. Cantilevered arms of cooling element 520 may be driven out-of-phase or in-phase. In some embodiments, cooling system 500 includes multiple cooling cells analogous to the cooling cell shown. Cooling system 500 also includes cover 506 that is analogous to cover(s) 306 and 406. Although not depicted, cooling system 500 may include a membrane, flow chamber, and support members analogous to membrane 470, flow chamber 471, and support members 472.

Cooling system 500 also includes spout 561 having top housing 562 and bottom housing 564. In some embodiments, top and bottom housings are formed from a single piece. Spout 561 may be used to at least partially equilibrate the pressure wave generated by the vibrational motion of cooling element 520. Spout 561 may also be used to direct the flow of gas. For example, the gas (shown by unlabeled arrows in FIG. 5) is depicted as traveling in a direction substantially perpendicular to housing 580. In some embodiments, spout 561 may be used to aim the flow of gas in a different direction.

FIG. 5 also depicts housing 580 for a device (e.g., a smartphone) in which cooling system 500 is incorporated. Cooling system 500 is thus in the interior of housing 580. Housing 580 is analogous to housing 480. Thus, housing 580 includes aperture 582 and flow control device 584 that is analogous to housing 480, aperture 482, and flow control device 484. Thus, flow control device 584 might be a valve or membrane. For simplicity, flow control device 584 is generally referred to as membrane 584 hereinafter. Thus, membrane 584 is watertight but gas breathable. Consequently, the device (e.g. housing 580) is watertight, but gas breathable. Because cooling system 500 is analogous to cooling system 400, cooling system 500 drives gas through membrane 584 but does not drive liquid through membrane 584.

Also shown are immersion sensor 592 and splash guard 594. Immersion sensor 592 is shown as located in proximity to aperture 582 and on the outside of housing 580. In some embodiments, immersion sensor 592 may be located elsewhere. Immersion sensor 592 detects when the device is immersed in a liquid (e.g. water). In response to a determination by immersion sensor 592 that the device is immersed in water, cooling system 500 may be deactivated. Thus, cooling system 500 does not operate to drive fluid (e.g. a gas) through the device if the device is immersed in liquid. When the device is immersed in liquid, active cooling may be unnecessary and may be damaging to cooling system 500 or the device. Deactivation of cooling system 500 when the device is immersed in liquid may extend the life of cooling system 500 and/or the corresponding device. In addition, if flow control device 584 is a valve, such a valve may be closed in response to the determination that the device is immersed in a liquid. As a result, the device (i.e. housing 580) may remain watertight.

Splash guard 594 allows for gas to flow relatively freely from aperture 582. Splash guard 594 also at least partially protects aperture 582 and membrane 584 from liquid splashed on or around aperture 582. Splash guard 594 may not protect the interior of housing 580 from liquid if the device is immersed in liquid. Thus, splash guard 594 may have particular utility for flow control device 584 being a valve instead of a watertight, breathable membrane. In some embodiments, a membrane that is not watertight, such as an IP64 membrane, may be used in conjunction with a valve at or near aperture 582. Although a particular geometry is shown for splash guard 594, another geometry may be used in some embodiments.

Cooling system 500 operates in an analogous manner to cooling systems 100, 200, 300, and 400. Heat from a portion of the device in which system 500 is incorporated is transferred to heat-generating structure 502 (e.g. a heat spreader) and other portions of cooling system 500 via thermal conduction. Cooling element 520 is activated to undergo vibrational motion. The vibrational motion of cooling element 520 draws fluid (e.g. a gas such as air) into vent 512, directs the gas through flow chamber 540/450, and drives the gas out of flow chamber 540/450 via orifices 532, through spout 561 and through aperture 582. The gas carries with it heat from heat-generating structure 502 as well as from other portions of cooling system 500. Consequently, cooling system 500 may efficiently transfer cool portions of the device.

The vibrational motion of cooling element 520 also generates a pressure wave such that the gas driven by cooling element 520 is under high pressure. The gas exits spout 561 in proximity to aperture 582. Cooling system 500 thus drives the gas through aperture 582, even in the presence of a barrier to flow such as a membrane 584, while mitigating or preventing heat dump within the device. Spout 562 may also aim the flow of gas. For example, the gas might be aimed slightly downward to more readily flow through splash guard 594. Further, the gas exiting the device via aperture 582 creates suction within the device. As a result, gas is drawn into the device (i.e. into housing 580) via an inlet (not shown in FIG. 5). The gas drawn into the device may travel through another membrane or other flow control device analogous to membrane 584. Entry of the gas into the device is accomplished without drawing liquid into the device. In some embodiments, the device is designed such that the inlet gas flows on other hot spots before entering cooling system 500. This helps to improve the coefficient of thermal spreading. Consequently, cooling system 500 may efficiently cool a device that is watertight. Immersion sensor 592 may not only aid in ensuring that flow control device 584 prevents liquid from flowing into housing 580, but also in controlling cooling system 500.

Cooling system 500 shares the benefits of cooling systems 100, 200, 300, and/or 400. Thus, fluid driven by cooling system 500 efficiently cools heat spreader 502 and, therefore, structures that are thermally coupled (e.g. via conduction) with heat spreader 502. Cooling system 500 performs this function in a device that is watertight. Thus, active cooling of a watertight device may be facilitated. In addition, spout 561 allows for aiming of the gas flow and mitigating heat dump. Splash guard 594 aids in ensuring that housing 580 remains watertight, particularly if a valve is used. Immersion sensor 592 may facilitate control of a valve and cooling system 500. Cooling system 500 also allows for the more efficient and reliable cooling of a device that is watertight. Thus, performance of such a device may be improved.

Figure 6A:
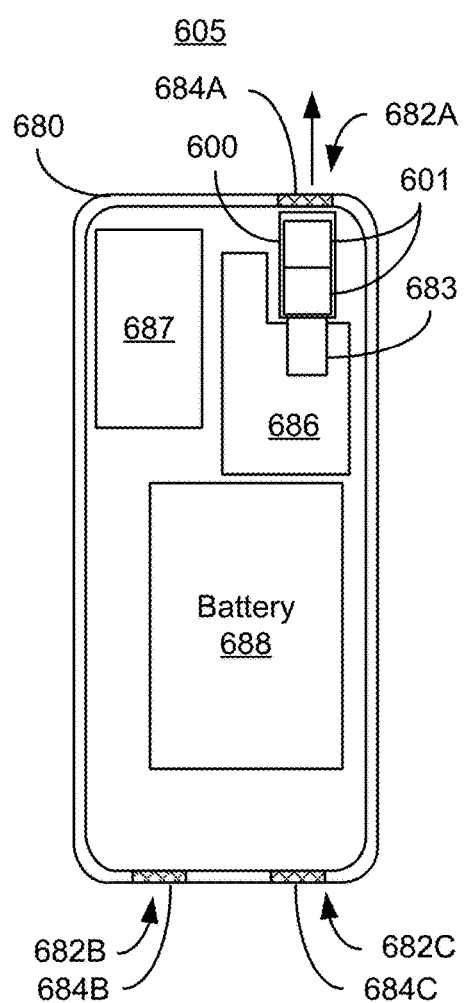
FIGS. 6A-B depicts an embodiment of an active MEMS cooling system used in a watertight device and a heat map of the device during use.
Figure 6B:
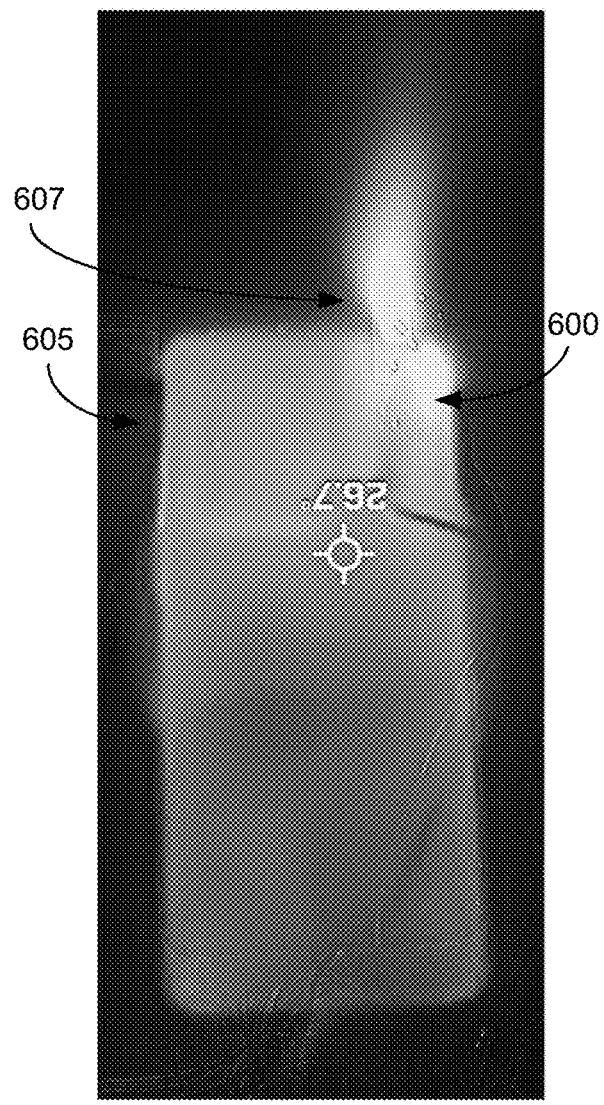

FIGS. 6A-B depicts an embodiment of active MEMS cooling system 600 used in watertight computing device 605 and a heat map of the device during use. FIGS. 6A-6B are not to scale. Device 605 is a watertight smartphone. Device 605 includes housing 680, integrated circuit(s) (indicated generally) 686, camera 687, and battery 688. Integrated circuit(s) 686 may be considered to be a circuit board having processor(s) and/or other integrated circuit(s) affixed thereto. Smartphone 605 includes other components that are not explicitly depicted for clarity. Housing 680 includes apertures 682A, 682B, and 682C (collectively or generically aperture(s) 682) and watertight, air breathable membranes 684A, 684B, and 684C (collectively or generically membranes 684). Membranes 684 thus allow for gas (e.g. air) to pass into and out of housing 680 while ensuring that device 605 remains watertight. For example, membranes 684 may be IP68 membranes. Although depicted at the outer edge of device 605, one or more of apertures 682 and/or corresponding membranes 684 may be closer to the central portion of device 605.

Cooling system 600 is analogous to cooling systems 100, 200, 300, 400, and/or 500. MEMS cooling system 600 may thus be considered to be a heat transfer or fluid transfer system. Cooling system 600 includes cooling cells 601 that are analogous to cooling cells 301. Cooling system 600 is thermally coupled with integrated circuit(s) 686 via heat spreader (or vapor chamber) 683. Heat spreader 683 is thermally connected to integrated circuit(s) 686. In other embodiments, cooling system 600 may be on or directly physically connected to integrated circuit(s) 686 by a heat spreader analogous to heat spreader(s) 402 and 502. Heat is transferred from integrated circuit(s) 686 to cooling system 600 via thermal conduction.

Cooling system 600 operates in an analogous manner to cooling systems 100, 400, and 500. Vibrational motion of cooling elements in cooling cells 601 generates a pressure wave that drives fluid (i.e. a gas such as air) through cooling system 600, through membrane 684A and out of aperture 682A. The heat from integrated circuit(s) 686 is conducted to heat spreader 683, conducted to cooling system 600, and transferred to the gas in cooling system 600. The gas, and thus the transferred heat, is removed from device 605 via aperture 682A. The flow of gas out of aperture 682A may generate a low-pressure region that draws gas in through membrane(s) 684B and/or 684C and through aperture(s) 682B and/or 682C. This transfer of gas and heat via apertures 684 is accomplished without liquid ingressing or egressing via apertures 684.

FIG. 6B is a heat map depicting this transfer of heat from device 605. Device 605 is bright due to the heat generated by components such as integrated circuit(s) 686 (not labeled in FIG. 6B). The surrounding environment is much cooler and thus darker. The heat generated by integrated circuit(s) 686 (and/or other components) is conducted to cooling system 600. Because it has heat transferred to it, cooling system 600 is also bright. Cooling system 600 transfers the heat to a gas and drives the gas through watertight breathable membrane 684A (not labeled in FIG. 6B) and out of the corresponding aperture 682A (not labeled in FIG. 6B). The heated gas 607 is outside of device 605 and bright in FIG. 6B because of the heat carried by the gas. Consequently, cooling system 600 may efficiently transfer heat via a gas that is driven through a watertight breathable membrane. Cooling system 600 may actively and efficiently cool a watertight device. Cooling system 600 thus shares the benefits of cooling systems 100, 200, 300, 400, and/or 500.

Figure 7:
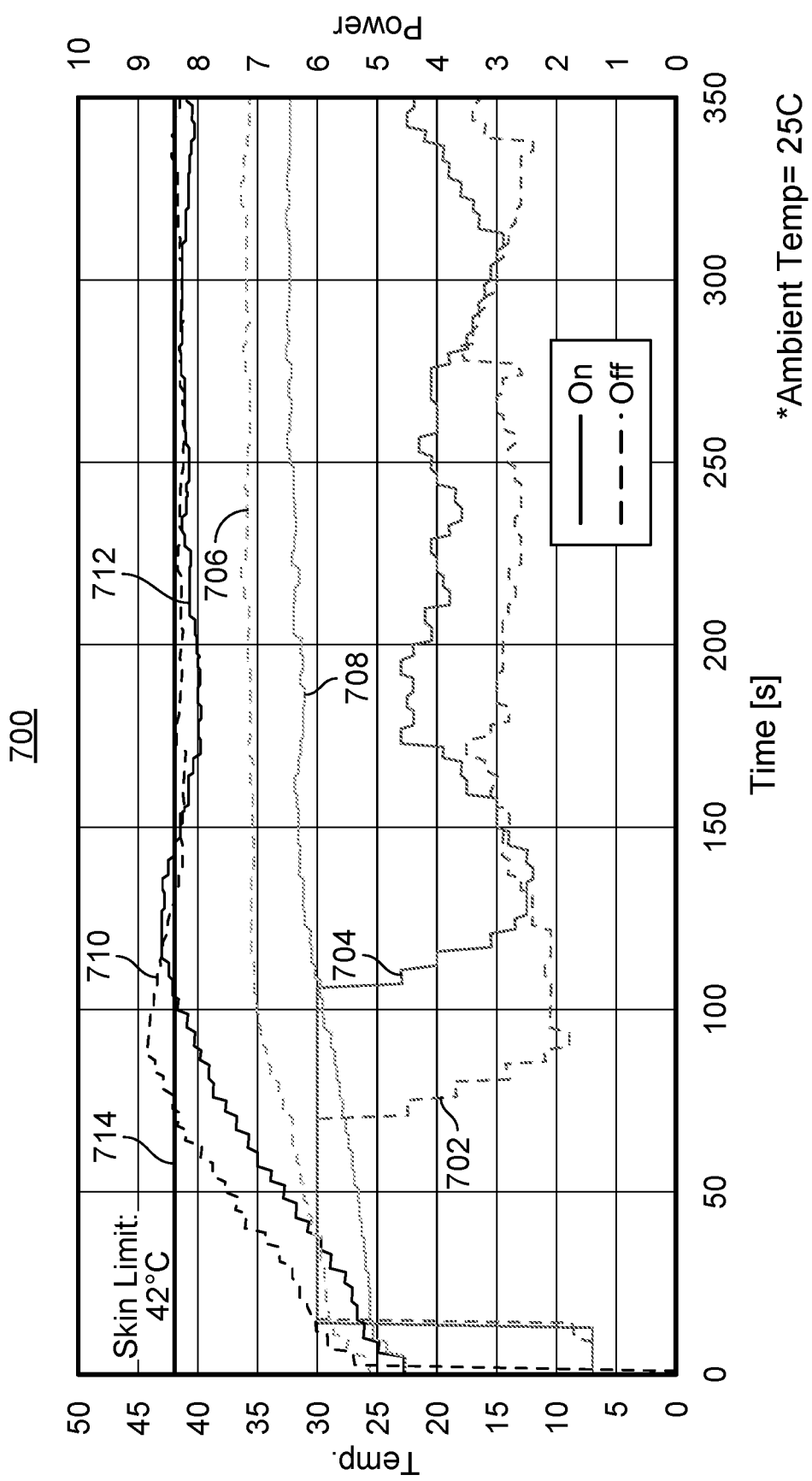
FIG. 7 is a graph indicating the performance of an active MEMS cooling system in a watertight device.

FIG. 7 is graph 700 indicating the performance of an active MEMS cooling system in a watertight device. Although specific shapes and behaviors of various parameters are depicted, graph 700 is for explanatory purposes only. Thus, graph 700 need not depict behavior of a particular device. For clarity, graph 700 is described in the context of device 605.

Graph 700 includes curves 702, 704, 706, 708, 710, and 712. Line 714 depicts the skin temperature limit for device 605. For some devices, the skin temperature limit is forty-two degrees Celsius. Curve 702 indicates the power provided to an integrated circuit 686 (e.g. a system-on-chip) versus time for cooling system 600 being deactivated. Curve 704 indicates the power provided to an integrated circuit 686 (e.g. a system-on-chip integrated circuit) versus time for cooling system 600 being activated. A comparison of curves 702 and 704 indicates that the power provided to the integrated circuit 686 is throttled (i.e. decreased below a maximum) earlier in time for cooling system 600 being deactivated. Further, the power provided to integrated circuit 686 after throttling may be generally lower for cooling system 600 being deactivated. This is because device 605 has more robust cooling when cooling system is activated. Thus, performance of integrated circuit 686 is improved by having a high power for longer for cooling system 600 being activated.

Curve 706 indicates the temperature of the back cover of device 605 versus time for cooling system 600 being deactivated. Curve 708 indicates the temperature of the back cover of device 605 versus time for cooling system 600 being activated. Curves 706 and 708 indicate that the back cover temperature increases while power is provided integrated circuit 686. However, a comparison of curves 706 and 708 indicate that the back cover temperature rises more slowly and reaches a lower temperature for curve 708, for which cooling system 600 is activated. Thus, use of cooling system 600 also mitigates the rise in skin temperature of the back cover of device 605.

Curve 710 indicates the temperature of the display of device 605 versus time for cooling system 600 being deactivated. Curve 712 indicates the temperature of the display of device 605 versus time for cooling system 600 being activated. Curves 710 and 712 indicate that the display temperature increases while higher power is provided integrated circuit 686. Shortly after the power to integrated circuit 686 is throttled, the temperature of the display of device 605 decreases to below the skin temperature limit indicated by line 714. A comparison of curves 710 and 712 indicates that the display temperature rises more slowly and peaks at a lower temperature for curve 712, for which cooling system 600 is activated. Thus, use of cooling system 600 also mitigates the skin temperature of the display of device 605. Thus, use of cooling systems, such as cooling system 600, in watertight computing devices may improve performance and usability of the device.

Figure 8:
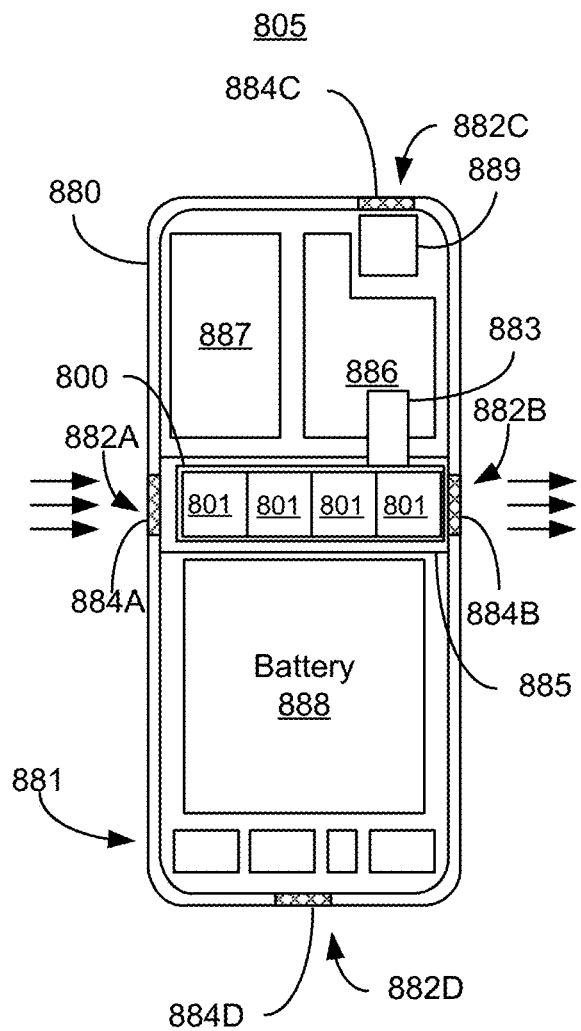
FIG. 8 depicts an embodiment of an active MEMS cooling system used in a watertight device.

FIG. 8 depicts an embodiment of active MEMS cooling system 800 used in watertight device 805. FIG. 8 is not to scale. Device 805 is a watertight smartphone. Device 805 includes housing 880, various components 881, integrated circuit(s) (indicated generally) 886, camera 887, battery 888, and speaker 889. Components 881 may include a SIM card, charger, interface, microphone, and/or other components. Integrated circuit(s) 886 may be considered to be a circuit board having processor(s) and/or other integrated circuit(s) affixed thereto. Smartphone 805 may include other and/or different components that are not explicitly depicted. Housing 880 includes apertures 882A, 882B, 882C, and 882D (collectively or generically aperture(s) 882) and watertight, air breathable membranes 884A, 884B, 884C, and 884D (collectively or generically membranes 884). Membranes 884 thus allow for gas (e.g. air) to pass into and out of housing 880 while ensuring that device 805 remains watertight. For example, membranes 884 may be IP68 membranes. Although depicted at the outer edge of device 805, one or more of apertures 882 and/or corresponding membranes 884 may be closer to the central portion of device 805. Device 805 also includes channel 885 in which cooling system 800 resides. Channel 885 is configured with an inlet at aperture 882A and an exit at aperture 882B.

Cooling system 800 is analogous to cooling systems 100, 200, 300, 400, 500, and/or 600. MEMS cooling system 800 may thus be considered to be a heat transfer or fluid transfer system. Cooling system 800 includes cooling cells 801 that are analogous to cooling cells 301 and 601. Cooling system 800 is thermally coupled with integrated circuit(s) 886 via heat spreader (or vapor chamber) 883. Heat spreader 883 is thermally connected to integrated circuit(s) 886. In other embodiments, cooling system 800 may be on or directly physically connected to integrated circuit(s) 886 by a heat spreader analogous to heat spreader(s) 402 and 502. Heat is transferred from integrated circuit(s) 886 to cooling system 800 via thermal conduction.

Cooling system 800 operates in an analogous manner to cooling systems 100, 400, 500, and 600. Vibrational motion of cooling elements in cooling cells 801 generates a pressure wave that drives fluid (i.e. a gas such as air) through cooling system 800, through membrane 884A and out of aperture 882A. The heat from integrated circuit(s) 886 is conducted to heat spreader 883, conducted to cooling system 800, and transferred to the gas in cooling system 800. The gas, and thus the transferred heat, is removed from device 805 through membrane 884A via aperture 882B. The flow of gas out of aperture 882B may generate a low-pressure region that draws gas in through membrane 884B and through aperture(s) 882B.

Cooling system 800 shares the benefits of cooling systems 100, 200, 300, 400, 500, and/or 600. In particular, cooling system 800 can efficiently cool a watertight device. Further, the configuration of device 805 including channel 885 allows for efficient flow of gas through device 800. The ability of cooling system 800 to transfer heat from device 805 may be further enhanced.

Various embodiments have been described herein. Features of the embodiments described may be combined in manners not explicitly disclosed. For example, membrane (dust cover) 470 is described with respect to cooling system 400. However, other cooling systems including but not limited to cooling systems 100, 200, 300, 500, 600, and/or 800 may include such a membrane.

Figure 9:
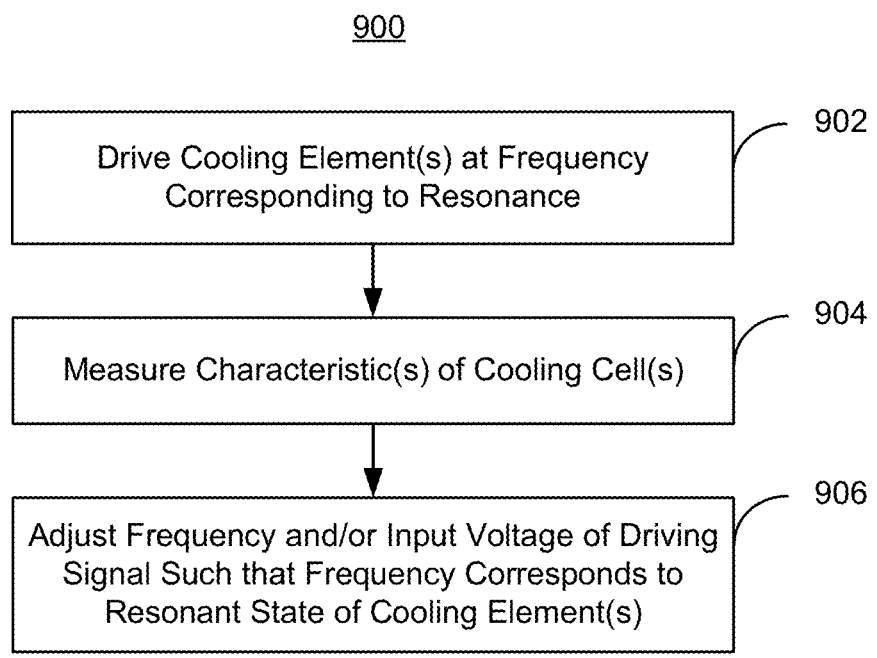
FIG. 9 depicts an embodiment of a method for using an active cooling mems system.

FIG. 9 depicts an embodiment of method 900 for using an active cooling system. Method 900 may include steps that are not depicted for simplicity. Method 900 is described in the context of system 800. However, method 900 may be used with other cooling systems including but not limited to systems and cells described herein.

A driving signal at a frequency and an input voltage corresponding to the resonant state of one or more cooling elements is provided to the active MEMS cooling system, at 902. In some embodiments, a driving signal having the frequency corresponding to the resonant frequency of a specific cooling element is provided to that cooling element. In some embodiments, a driving signal is provided to multiple cooling elements. In such embodiments, the frequency of the driving signal corresponds to the resonant state of one or more cooling elements being driven, a statistical measure of the resonance, and/or within a threshold of the resonance as discussed above.

Characteristic(s) of the MEMS cooling system are monitored while the cooling element(s) are driven to provide a feedback signal corresponding to a proximity to a resonant state of the cooling element(s), at 904. In some embodiments, characteristic(s) of each individual cooling element are monitored to determine the deviation of the frequency of vibration for that cooling element from the resonant frequency of that cooling element. In some embodiments, characteristic(s) for multiple cooling elements are monitored at 904. The characteristic(s) monitored may be a proxy for resonance and/or a deviation therefrom. For example, the voltage at the cooling element, the power drawn by the cooling element, power output by the power source, peak-to-peak current output by the power source, peak voltage output by the power source, average current output by the power source, RMS current output by the power source, average voltage output by the power source, amplitude of displacement of the at least one cooling element, RMS current through the cooling element, peak voltage at the cooling element, average current through the cooling element, average voltage at the at least one cooling element, and/or the peak current drawn by the cooling element may be monitored. Using the characteristic(s) monitored, a deviation from the resonant state of the cooling element (e.g. deviation of the driving/vibration frequency from the resonant frequency) may be determined.

The frequency and/or input voltage is adjusted based on the feedback signal, at 906. More specifically, 906 includes updating the frequency and/or input voltage, based on the feedback signal, to correspond to resonant state(s) of the cooling element(s) at 906. For example, the frequency for the drive signal may be updated to more closely match the resonant frequency/frequencies. In some embodiments, updating the frequency includes changing the frequency to correspond to a power drawn corresponding to the vibration of the cooling element(s) being maximized, a voltage provided at the cooling element(s) being maximized, a voltage across the cooling element(s) being minimized, and/or an amplitude of a current drawn by the at least one cooling element being minimized. In some embodiments, 906 includes determining whether the feedback signal indicates that a drift in the resonant frequency of the cooling element(s) exceeds a threshold and identifying a new frequency in response to a determination that the drift exceeds the threshold. The new frequency accounts for the drift in the resonant frequency. The method also includes setting the new frequency as the frequency for the driving signal in response to the new frequency being identified.

For example, cooling elements analogous to cooling element 420 in MEMS cooling system 800 are driven, at 902. Thus, the cooling element is driven at a frequency that is at or near resonance for one or more of the cooling elements.

Characteristics of cooling elements within MEMS cooling system 800 are monitored, at 904. Thus, the drift of the cooling element(s) from resonance may be determined. The frequency may be adjusted based on the monitoring of 904, at 906. Thus, MEMS cooling system 800 may be kept at or near resonance. Because of the vibrational motion induced in the cooling element, a gas can be driven out of the smartphone though a watertight, gas breathable membrane or other flow control device, and gas drawn into the smart phone.

Thus, using method 900, an active cooling system, such as cooling system(s) 100, 200, 300, 400, 500, 600, and/or 800 may be efficiently driven. These cooling systems are also configured for improved alignment, symmetry, efficiency, and/or reliability. Thus, method 900 may be used to operate active MEMS cooling systems and achieve the benefits described herein. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computing device, comprising: a housing having a plurality of apertures therein; at least one of a plurality of membranes or a plurality of valves coupled with the plurality of apertures, each of the plurality of membranes being watertight and gas breathable, the plurality of valves being configured to prevent entry of water through the plurality of apertures; an active cooling system in the housing that when activated drives a gas through a membrane of the plurality of membranes but does not drive the water through the membrane; and a water immersion sensor that determines whether the computing device is immersed in water, the active cooling system being deactivated in response to a determination that the computing device is immersed in water.

2. The computing device of claim 1, wherein the computing device is a smart phone.

3. The computing device of claim 1, wherein the computing device includes the plurality of valves and wherein the plurality of valves close in response to the determination that the computing device is immersed in water.

4. The computing device of claim 3, further comprising:
a plurality of splash guards for the plurality of apertures.

5. The computing device of claim 1, wherein the computing device includes the plurality of membranes and wherein the active cooling system when activated draws the gas into the housing through an additional membrane of the plurality of membranes but does not draw water through the additional membrane and drives the gas out of the housing through the membrane.

6. The computing device of claim 5, wherein the housing has a first side and a second side opposite to the first side, the membrane being coupled with a first aperture on the first side, the additional membrane being coupled with a second aperture on the second side.

7. The computing device of claim 5, wherein the active cooling system includes an egress adjoining the membrane.

8. The computing device of claim 7, wherein the active cooling system includes a spout having the egress, the spout being coupled with the housing and terminating at the membrane.

9. The computing device of claim 5, wherein the active cooling system includes at least one cooling element undergoing vibrational motion when the active cooling system is activated, the vibrational motion driving the gas.

10. The computing device of claim 9, wherein the active cooling system is thermally coupled to a heat-generating structure of the computing device by thermal conduction.

11. A smart phone, comprising: a housing having a plurality of apertures therein; at least one of a plurality of membranes or a plurality of valves coupled with the plurality of apertures, each of the plurality of membranes being watertight and gas breathable, the plurality of valves being configured to prevent entry of water through the plurality of apertures, the housing being watertight; an active cooling system in the housing that when activated drives a gas through a membrane of the plurality of membranes but does not drive the water through the membrane; and a water immersion sensor that determines whether the smart phone is immersed in water, the active cooling system being deactivated in response to a determination that the smart phone is immersed in water.

12. The smart phone of claim 11, wherein the smart phone includes the plurality of valves, and wherein the plurality of valves closes in response to the determination that the smart phone is immersed in water.

13. The smart phone of claim 12, further comprising:
a plurality of splash guards for the plurality of apertures.

14. The smart phone of claim 11, wherein the smart phone includes the plurality of membranes and wherein the active cooling system when activated draws the gas into the housing through an additional membrane of the plurality of membranes but does not draw water through is the additional membrane and drives the gas out of the housing through the membrane.

15. The smart phone of claim 14, wherein the housing has a first side and a second side opposite to the first side, the membrane being coupled with a first aperture on the first side, the additional membrane being coupled with a second aperture on the second side.

16. The smart phone of claim 14, wherein the active cooling system includes an egress adjoining the membrane.

17. The smart phone of claim 14, wherein the active cooling system includes at least one cooling element undergoing vibrational motion when the active cooling system is activated, the vibrational motion driving the gas.

18. A method, comprising: driving at least one cooling element of an active cooling system to undergo vibrational motion; wherein the active cooling system is in a smart phone including the active cooling system, a housing having a plurality of apertures therein, and at least one of a plurality of membranes or a plurality of valves coupled with the plurality of apertures, each of the plurality of membranes being watertight and gas breathable, the plurality of valves being configured to prevent entry of water through the plurality of apertures, when activated the vibrational motion of the at least one cooling element driving a gas through a membrane of the plurality of membranes but not driving the water through the membrane; wherein the active cooling system includes a water immersion sensor that determines whether the smart phone is immersed in water, the active cooling system being deactivated in response to a determination that the smart phone is immersed in water.

* * * * *